US012780147B2

(12) United States Patent
Matsumoto et al.

(10) Patent No.: US 12,780,147 B2
(45) Date of Patent: Nov. 3, 2026

(54) VEHICLE CONTROL DEVICE AND VEHICLE CONTROL METHOD

(71) Applicant: DENSO CORPORATION, Kariya-city (JP)

(72) Inventors: Takayuki Matsumoto, Kariya-city (JP); Nobuyasu Okabe, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 0 days.

(21) Appl. No.: 18/888,883

(22) Filed: Sep. 18, 2024

(65) Prior Publication Data

US 2025/0010815 A1 Jan. 9, 2025

Related U.S. Application Data

(63) Continuation of application No. PCT/JP2023/009389, filed on Mar. 10, 2023.

(30) Foreign Application Priority Data

Mar. 24, 2022 (JP) ................................ 2022-048819

(51) Int. Cl.
*B60R 25/24* (2013.01)
*B60R 25/01* (2013.01)
*B60R 25/34* (2013.01)

(52) U.S. Cl.
CPC ............ *B60R 25/245* (2013.01); *B60R 25/01* (2013.01); *B60R 25/34* (2013.01)

(58) Field of Classification Search
CPC ....... G01S 5/14; G01S 11/06; G07C 9/00309; G07C 9/00571; G07C 9/00; B60R 16/03; B60R 25/34; B60R 25/24; B60R 25/2054; B60R 25/245; H04L 9/0861; E05F 15/70; B60J 5/047; H04W 12/062; H04W 4/44; G08G 1/16
See application file for complete search history.

(56) References Cited

U.S. PATENT DOCUMENTS

2013/0151084 A1* 6/2013 Lee ..................... B60R 25/2054 701/1
2014/0203924 A1* 7/2014 Shin ......................... G08G 1/16 340/435
2015/0070136 A1* 3/2015 Kameyama .............. G07C 9/00 340/5.72
2018/0261027 A1* 9/2018 Fujiwara ................. H04W 4/44
2018/0261028 A1* 9/2018 Fujiwara ............. H04W 12/062
(Continued)

FOREIGN PATENT DOCUMENTS

JP 5846024 B2 1/2016

*Primary Examiner* — Yuri Kan
(74) *Attorney, Agent, or Firm* — Harness, Dickey & Pierce, P.L.C.

(57) ABSTRACT

A vehicle control apparatus determines a location of a key device through wireless communication with the key device. The vehicle control apparatus is configured to perform a wireless authentication process of determining whether a communication partner is the key device and a location determination process of determining whether the communication partner is present in a vehicle, and to identify an authentication failure reason that is a reason why the communication partner has failed to be determined as the key device.

17 Claims, 10 Drawing Sheets

(56) References Cited

U.S. PATENT DOCUMENTS

| | | | | |
|---|---|---|---|---|
| 2019/0168712 | A1* | 6/2019 | Yakovenko | B60R 25/24 |
| 2020/0029213 | A1* | 1/2020 | Nölscher | B60R 25/24 |
| 2021/0076203 | A1* | 3/2021 | Sakamoto | B60R 25/34 |
| 2021/0207967 | A1* | 7/2021 | LaCroix | G07C 9/00571 |
| 2022/0339993 | A1* | 10/2022 | Sugita | B60J 5/047 |
| 2022/0340102 | A1* | 10/2022 | Sugita | E05F 15/70 |
| 2023/0256936 | A1* | 8/2023 | Cosentino | H04L 9/0861<br>340/5.72 |
| 2024/0034271 | A1* | 2/2024 | Lindberg Nilsson | B60R 16/03 |
| 2024/0257590 | A1* | 8/2024 | Sanji | G07C 9/00309 |
| 2024/0336226 | A1* | 10/2024 | Saiki | G01S 11/06 |

* cited by examiner

VEHICLE CONTROL DEVICE AND VEHICLE CONTROL METHOD

CROSS REFERENCE TO RELATED APPLICATION

The present application is a continuation application of International Patent Application No. PCT/JP2023/009389 filed on Mar. 10, 2023 which designated the U.S. and claims the benefit of priority from Japanese Patent Application No. 2022-048819 filed on Mar. 24, 2022. The entire disclosures of all of the above applications are incorporated herein by reference.

TECHNICAL FIELD

The present disclosure relates to a vehicle control apparatus and a vehicle control method for performing vehicle control related to locking/unlocking of a vehicle after authenticating the validity of a communication partner.

BACKGROUND

A related art discloses a configuration that recognizes a key device remaining in a vehicle when the vehicle is locked by an automatic lock function and invalidates the key device. Unless the key device remaining in the vehicle is invalidated, the key device remaining in the vehicle responds to a search signal from the vehicle based on an unlocking operation, so that anyone can unlock the vehicle. The above control related to key device invalidation addresses such a problem.

SUMMARY

A vehicle control apparatus determines a location of a key device through wireless communication with the key device. The vehicle control apparatus is configured to perform a wireless authentication process of determining whether a communication partner is the key device and a location determination process of determining whether the communication partner is present in a vehicle, and to identify an authentication failure reason that is a reason why the communication partner has failed to be determined as the key device.

BRIEF DESCRIPTION OF DRAWINGS

Objects, features and advantages of the present disclosure will become more apparent from the following detailed description made with reference to the accompanying drawings. In the drawings.

DETAILED DESCRIPTION

Figure 1:
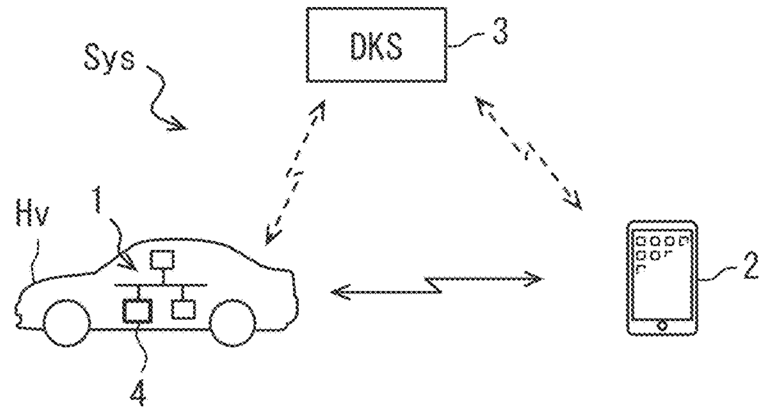
FIG. 1 is a view illustrating an overall image of a vehicle digital key system.

There is known a system in which an in-vehicle system performs wireless communication with a key device to perform location estimation and authentication of the key device and automatically lock/unlock a vehicle. This system is called a smart entry system, a passive entry passive start (PEPS) system, or the like.

To prevent the key device from being confined in the vehicle (so-called in-lock), control may be introduced to the PEPS key system to output a warning sound or the like when it is detected that the key device remains in the vehicle interior when the locking operation is accepted.

Controls, such as outputting a warning sound to prevent confinement and invalidating a key device left in the vehicle, operate as intended by a designer (i.e., normally) on condition that it has been confirmed through wireless communication that the key device left in the vehicle.

However, the location determination and collation processing through wireless communication are affected by the radio environment or other factors, making it possible for the key device not to be determined as being in the vehicle, even though the key device remains in the vehicle. Naturally, when the in-vehicle system cannot recognize the key device remaining in the vehicle for some reason at the time of locking, control such as confinement prevention does not function.

In recent years, the authentication process between key devices and in-vehicle systems has become more advanced/complex due to the introduction of relay attack countermeasures and digital key systems. Accordingly, authentication failures of portable devices may occur for various reasons. That is, in the future, there is a concern about an increase in the number of cases where outputting a warning sound to prevent confinement or invalidating a key device left in the vehicle is inoperative.

The present disclosure provides a vehicle control apparatus and a vehicle control method capable of reducing the risk of determining that a portable device that can function as a vehicle key is not present in the vehicle due to an authentication failure, even though the portable device is actually present in the vehicle.

According to one aspect of the present disclosure, a vehicle control apparatus that determines a location of a key device through wireless communication with the key device is provides. The key device is a portable device registered in advance as a key of a vehicle. The vehicle control apparatus includes: a device location confirmation unit that is configured to perform a wireless authentication process of determining whether a communication partner is the key device based on data transmitted from the communication partner, and a location determination process of determining whether the communication partner is present in a vehicle based on a reception status of a signal from the communication partner; and a failure reason identification unit that is configured to identify, based on the data received from the communication partner, an authentication failure reason that is a reason why the communication partner has failed to be determined as the key device when the device location confirmation unit has failed to determine that the communication partner is the key device in the wireless authentication process. The device location confirmation unit considers the key device to be present in the vehicle even if the device location confirmation unit has been unable to determine that the communication partner is the key device when the authentication failure reason is a specific reason and the communication partner has been determined to be located in the vehicle.

According to one aspect of the present disclosure, a vehicle control method that is performed by at least one processor to determine a location of a key device through wireless communication with the key device is provided. The key device is a portable device registered in advance as a key of a vehicle. The vehicle control method includes: determining whether a communication partner is present in a vehicle based on a reception status of a wireless signal from the communication partner; determining whether the communication partner is the key device based on data transmitted from the communication partner; identifying, based on a content of the data received from the communication partner, an authentication failure reason that is a reason why the communication partner has failed to be determined as the key device when the communication partner has failed to be determined to be the key device; and considering the key device to be present in the vehicle even if the communication partner has failed to be determined to be the key device, when the authentication failure reason is a specific reason and the communication partner has been determined to be present in the vehicle.

According to the above apparatus and method, even if the authentication of the portable device fails, the portable device is considered to be present in the vehicle when the reason for the failure is a specific one. This can reduce the possibility of the portable device being determined not to be present in the vehicle due to authentication failure, even though the portable device is actually present in the vehicle.

Hereinafter, an embodiment of the present disclosure will be described with reference to the drawings. FIG. 1 is a diagram illustrating an example of a schematic configuration of a vehicle digital key system Sys. As illustrated in FIG. 1, the vehicle digital key system Sys includes an in-vehicle system 1, a portable device 2, and a digital key server (DKS) 3. The in-vehicle system 1 is a system mounted in a vehicle Hv. The portable device 2 is a device carried by a user of the vehicle Hv. There may be a plurality of portable devices 2.

<Introduction>

The vehicle Hv in the following description is, for example, a four-wheeled automobile owned by an individual. The user of the vehicle Hv may be an owner, a family, or the like. The vehicle Hv may be a company vehicle owned by a company organization or a public vehicle owned by a public institution. When the vehicle Hv is a company vehicle or a public vehicle, a person belonging to an organization that manages the vehicle Hv can be a user. The vehicle Hv may be a vehicle provided for a rental service (so-called rental car) or a vehicle provided for a car-sharing service (so-called shared car). When the vehicle Hv is a vehicle used for the above services (hereinafter, the service vehicle), a person who has made a use contract for the services and has the authority to temporarily use the vehicle Hv based on a service use reservation or the like can be a user.

The vehicle Hv may be an electric vehicle such as a hybrid vehicle (so-called plug-in hybrid vehicle) that can be externally charged. Examples of the electric vehicles include an electric automobile, a hybrid vehicle, and a fuel cell vehicle. The hybrid vehicle is a vehicle including an engine and a motor as power sources. As another aspect, the vehicle Hv may be an engine vehicle.

The vehicle Hv is a vehicle of a type in which the cabin and the trunk do not communicate with each other, such as a sedan type. The vehicle Hv is configured such that the locking mechanisms for all the doors can be set to the locked state while the trunk door is open. The trunk door may also be referred to as a rear hatch, a hatchback, a rear gate, or the like.

A driver's seat is provided on the right side of the vehicle Hv. As another aspect, the vehicle Hv may be a vehicle equipped with the driver's seat on the left side. In the following description, the front-rear, left-right, and up-down directions are defined with reference to the vehicle Hv when there is no annotation regarding the reference direction (i.e., basically).

Each of various flowcharts illustrated in the present disclosure is an example, and the number of steps constituting the flowchart and the execution order of the processes can be changed as appropriate. In addition, the following description can be modified as appropriate to conform to the laws, regulations, and practices of a region where the vehicle Hv is used.

<Overall Overview>

Both the in-vehicle system 1 and the portable device 2 are configured to be able to perform near-field communication. The near-field communication here is communication conforming to a predetermined near-field wireless communication standard, with a substantial communicable distance ranging from 1 m to 30 m, and at most about 100 m. The near-field communication standard may be Bluetooth (registered trademark), Wi-Fi (registered trademark), or the like. The Bluetooth standard may be Bluetooth Classic or Bluetooth Low Energy (BLE). Various standards such as IEEE802.11n, IEEE802.11ac, and IEEE802.11ax (so-called Wi-Fi 6) can be adopted as the Wi-Fi standard. IEEE (registered trademark) stands for "Institute of Electrical and Electronics Engineers" and may refer to the Institute of Electrical and Electronics Engineers. In addition, the communication method between the in-vehicle system 1 and the portable device 2, in other words, the near-field communication method, may be ultra-wideband impulse radio ranging (UWB-IR). Furthermore, the in-vehicle system 1 and the portable device 2 may be configured to be able to perform wireless communication using a radio wave in a low frequency (LF) band such as 125 kHz or 134 kHz.

hereinafter, the operation of each unit will be described with an example in which the in-vehicle system 1 and the portable device 2 are configured to be able to perform wireless communication conforming to the BLE standard (hereinafter, BLE communication). Details of the communication sequence, such as the communication connection and the start of cryptographic communication, are performed according to the BLE standard. The description of BLE communication in the following can be replaced that of UWB communication or near-field communication. The in-vehicle system 1 includes a smart ECU 4 as an apparatus that substantially performs data communication with the portable device 2. ECU is an abbreviation for electronic control unit and means an electronic control apparatus.

Hereinafter, a case where the smart ECU 4 is set to behave as a master in communication with the portable device 2 and the portable device 2 is set to behave as a slave will be described. The smart ECU 4 receives an advertisement signal from the portable device 2 to establish a communication connection with the portable device 2, and detects the presence of the portable device 2 (eventually, the user) around the vehicle Hv. The advertisement signal is a signal for notifying (i.e., advertising) another device of its own presence. As another aspect, the portable device 2 may be set to operate as a master in communication with the smart ECU 4.

A BLE signal that is a wireless signal conforming to the BLE standard can be transmitted from various apparatuses. In the present disclosure, devices that emit BLE signals are collectively referred to as BLE devices. The BLE devices are classified into registered devices paired with the vehicle Hv/smart ECU 4 and unregistered devices not paired with the vehicle Hv/smart ECU 4. The pairing may be the registration of at least a device identification (ID) of a communication partner in an internal storage or the like. The device ID is an identification number of the BLE device. The device ID may be a device address, a universally unique identifier (UUID), or the like. The portable device 2 is a registered device. The BLE signal such as the advertisement signal includes a device ID indicating a transmission source. The smart ECU 4 can identify whether the communication partner is the portable device 2 or an unregistered device based on the device ID included in the received signal.

The smart ECU 4 and the portable device 2 are configured to be able to communicate with the DKS 3 using a cellular line or a Wi-Fi (registered trademark) line. In the present disclosure, communication using a cellular line is referred to as cellular communication. The cellular communication is wireless communication conforming to a standard such as 4G or 5G. In the present disclosure, data communication using a Wi-Fi line is referred to as Wi-Fi communication. Various standards, such as IEEE802.11n, IEEE802.11ac, and IEEE802.11ax (so-called Wi-Fi 6), may be adoptable as the Wi-Fi standard.

The DKS 3 is a server disposed outside the vehicle Hv. The DKS 3 can perform data communication with each of the smart ECU 4 and the portable device 2 via a wide-area communication network such as the Internet. The DKS 3 issues a service key and a one-time authentication key for using the vehicle Hv to the portable device 2 based on a request from the portable device 2.

The service key is a code that is a basis for causing the portable device 2 to function as the key of the vehicle Hv. The service key differs for each combination of the vehicle Hv and the portable device 2. The DKS 3 may issue, as a service key, an output value of a predetermined hash function with combined values of the vehicle ID and the device ID as an input value. The vehicle ID is a unique identification number assigned to each vehicle. The vehicle ID may be a vehicle identification code (VIN: Vehicle Identification Number). The service key may be a password of a predetermined number of characters registered by the user or a value obtained by adding the password to a predetermined hash function.

The one-time authentication key is a so-called disposable authentication key that is discarded once used. The one-time authentication key is a code for the smart ECU 4 to confirm the validity of the communication partner, that is, whether the smart ECU 4 is truly the portable device 2. The one-time authentication key is generated by combining the service key with a variation code (variation factor). The variation code is a value different for each issuance of the one-time authentication key. The variation code may be an epoch second, the number of times a one-time authentication key is issued, or a random number. The one-time authentication key may be generated by inputting the service key and the variation code into a predetermined generation function. The generation function is a function that generates a one-time authentication key based on two input values of the service key and the variation code. The generation function may be a predetermined hash function. The input value to the generation function may be a value obtained by simply combining (i.e., concatenating) the service key and the variation code, or a value obtained by multiplying or adding these values. Such a one-time authentication key may also be referred to as a token.

<Portable Device 2>

The portable device 2 is a portable and general-purpose information processing terminal including a BLE communication function. The portable device 2 may be various communication terminals such as smartphones and wearable devices. The wearable device is a device used by being worn on the user's body and can adopt various shapes such as wristband, wristwatch, ring, eyeglass, and earphone types. The portable device 2 of the present disclosure may be implemented separately as a base ship (main machine) such as a smartphone and a wearable device.

Figure 2:
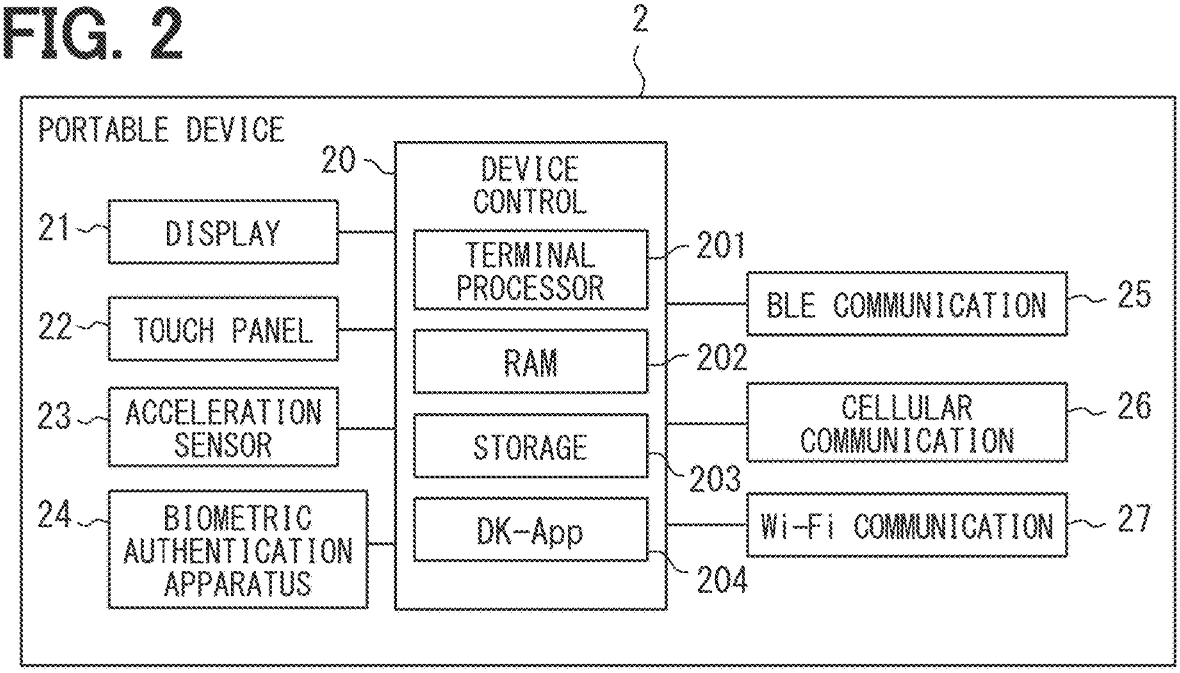
FIG. 2 is a block diagram illustrating a configuration of a portable device.

As illustrated in FIG. 2, the portable device 2 includes a device control unit 20, a display 21, a touch panel 22, an acceleration sensor 23, a biometric authentication apparatus 24, a BLE communication unit 25, a cellular communication unit 26, and a Wi-Fi communication unit 27.

The device control unit 20 is a module that controls the entire operation of the portable device 2. The device control unit 20 is configured as a computer including a device processor 201, a random-access memory (RAM) 202, a storage 203, and the like. The device processor 201 may be a central processing unit (CPU). The RAM 202 is a volatile storage medium. The storage 203 includes a nonvolatile storage medium such as flash memory.

The device control unit 20 includes a digital key application 204 as application software (hereinafter, application). The digital key application 204 is an application for securely performing authentication of a user, acquisition/storage of a service key, communication with the smart ECU 4, and the like. The digital key application 204 is installed in the storage 203 or the like.

The display 21 may be a liquid crystal display or an organic electroluminescent (EL) display. The display 21 displays an image according to an input signal from the device control unit 20. The touch panel 22 is a capacitive touch panel and is stacked on the display 21. The touch panel 22 is an input apparatus included in the portable device 2. The touch panel 22 and the display 21 correspond to interfaces for the user to input a password into the portable device 2 for logging in to the digital key application 204 and to pair the portable device 2 with the smart ECU 4.

The acceleration sensor 23 is a sensor that detects acceleration acting on the portable device 2. An output (i.e., detection data) of the acceleration sensor 23 is input into the device control unit 20. The output signal of the acceleration sensor 23 functions as a signal indicating whether the portable device 2 is in a portable state or a left state. The portable state may be a state of moving with the user or being operated by the user. The left state may be a state in which the user does not carry the portable device 2, in other words, a state in which the portable device 2 is placed in a stable place for a predetermined time or more. The stable location may be on a desk, a counter, a shelf, a floor, or the like. A seat, a console box, a trunk, or the like of a parked car can also be a stable place.

The biometric authentication apparatus 24 is an apparatus that authenticates the user by using biometric information such as a fingerprint or a face image of the user. The biometric authentication apparatus 24 may be an apparatus that authenticates the user by using a vein pattern of a hand or a finger, an iris pattern, a voiceprint, or the like. The authentication result of the user is provided to the device control unit 20.

The BLE communication unit 25 is a communication module for performing BLE communication. The cellular communication unit 26 is a communication module for performing cellular communication. Wi-Fi communication unit 27 is a communication module for performing Wi-Fi communication. Various communication modules include an antenna capable of transmitting and receiving radio waves in frequency bands targeted for transmission and reception, a communication microcomputer that is a microcomputer for controlling communication, a modulation/demodulation circuit, and the like. The cellular communication unit 26 and the Wi-Fi communication unit 27 are optional elements and may be omitted.

Figure 3:
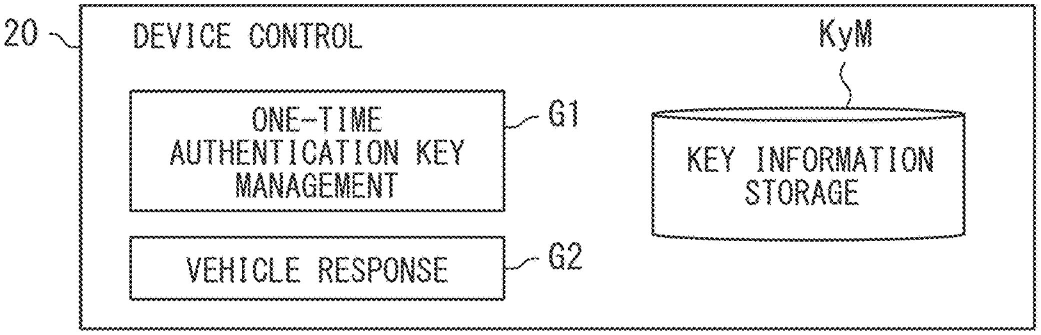
FIG. 3 is a functional block diagram of a device control unit.

As illustrated in FIG. 3, the device control unit 20 includes a one-time authentication key management unit G1 and a vehicle response unit G2 as functional units expressed when the device processor 201 executes the digital key application 204.

The device control unit 20 includes a key information storage unit KyM. The key information storage unit KyM is implemented using a storage area included in the storage 203 or the RAM 202. The key information storage unit KyM is a storage area for storing a service key for the host apparatus issued by the DKS 3, a one-time authentication key, a user ID, and the like.

The one-time authentication key management unit G1 acquires a one-time authentication key from the DKS 3 and stores the one-time authentication key in the key information storage unit KyM. The one-time authentication key management unit G1 transmits, at any time, a signal requesting the distribution of the one-time authentication key to the DKS 3 so as to maintain a state in which a predetermined number or more of the one-time authentication keys are stored in the key information storage unit KyM. The one-time authentication key management unit G1 sets a replenishment necessity flag to ON based on the fact that the remaining number of the one-time authentication keys stored in the key information storage unit KyM is less than a predetermined refill threshold. The one-time authentication key management unit G1 downloads a plurality of one-time authentication keys from the DKS 3 based on the fact that the replenishment necessity flag is set to ON and the state is an online state. The replenishment threshold may be 150, 300, or the like.

The DKS 3 distributes the one-time authentication key and the variation code as a set. That is, the one-time authentication key management unit G1 acquires each one-time authentication key from the DKS 3 in association with the variation code used for generating the one-time authentication key. The one-time authentication key management unit G1 itself does not include a function of generating a one-time authentication key. According to this configuration, the details of the one-time authentication key generation method can be concealed. Accordingly, the security performance of the vehicle digital key system Sys can be enhanced.

The vehicle response unit G2 is configured to execute data communication with the smart ECU 4 using the BLE, based on establishment of a link (connection) of the BLE communication with the smart ECU 4. The vehicle response unit G2 performs wireless communication for authentication based on the establishment of the BLE communication link with the smart ECU 4. The wireless authentication process between the smart ECU 4 and the portable device 2 may be performed by a challenge-response method. The vehicle response unit G2 generates a response code for a challenge code transmitted from the smart ECU 4 by using the one-time authentication key and returns the response code to the smart ECU 4.

The device control unit 20 determines whether the portable device 2 is in the portable state or the left state based on a signal from the acceleration sensor 23. The device control unit 20 may determine that the device control unit 20 is in the left state based on the fact that the stationary state has continued for a predetermined leaving determination time or more. The stationary state is a state in which acceleration of a predetermined value or more is not detected from the acceleration sensor 23. The leaving determination time may be set to 3 minutes or 5 minutes. When the state is determined as the left state, the vehicle response unit G2 does not return the response code to the vehicle Hv. As the leaving determination time is shorter, the possibility that the portable device 2 inadvertently responds to a call from the smart ECU 4 can be reduced, so that security and power-saving performance can be improved. The device control unit 20 determines the state as the portable state when acceleration of a predetermined value or more is detected. The determination result as the portable state can be maintained until it is determined that the state has shifted to the left state.

The device control unit 20 performs a user authentication process when the digital key application 204 is activated. The user authentication (login) can be performed by inputting a predetermined user ID and password into the digital key application 204. The user authentication may be performed using the biometric authentication apparatus 24. Since the digital key application 204 is a part of the vehicle digital key system Sys, the state in which the user logs in the digital key application 204 corresponds to the state in which the user logs in the vehicle digital key system Sys. As described above, the device control unit 20 includes a user authentication function that determines the validity of the operator (i.e., user) by using the biometric information or the password.

The login state is released when a predetermined expiration date has passed from the login time or the final operation time or when the portable device 2 is shut down. That is, the digital key application 204 transitions to the logoff state under a predetermined condition. The logoff state is a state in which the user needs to be re-authenticated. In the present disclosure, a state in which the portable device 2/digital key application 204 authenticates the user by using the biometric information or the password is referred to as a user authentication state.

In addition, the device control unit 20 may be configured to be able to display a vehicle state confirmation screen that is a screen for confirming the status of the vehicle Hv as a function of the digital key application 204. The vehicle state confirmation screen is a screen indicating the remaining gasoline/battery level, the open/closed state of each window and door, the locked state, the temperature inside the vehicle, and the like. The device control unit 20 may be configured to be able to remotely operate a part of the electrical equipment included in the vehicle Hv. The device control unit 20 may transmit a wireless signal instructing the locking/unlocking of the vehicle Hv, turning on/off of an air conditioner, opening/closing of a window, turning off of a hazard lamp, and the like, based on a user operation on the touch panel 22. For convenience, the instruction signal for locking the vehicle Hv is referred to as a locking instruction signal.

The portable device 2 may be a smart key that is a dedicated device serving as the electronic key of the vehicle Hv. The smart key is a device that is transferred to the owner together with the vehicle Hv when the vehicle Hv is purchased. The smart key can be considered as one of the appendages of the vehicle Hv. The smart key can adopt various shapes such as a flat rectangular parallelepiped type, a flat elliptical type (so-called fob type), and a card type. The smart key may be referred to as a vehicle portable, a key fob, a key card, an access key, or the like.

<Configuration of In-Vehicle System 1>

Figure 4:
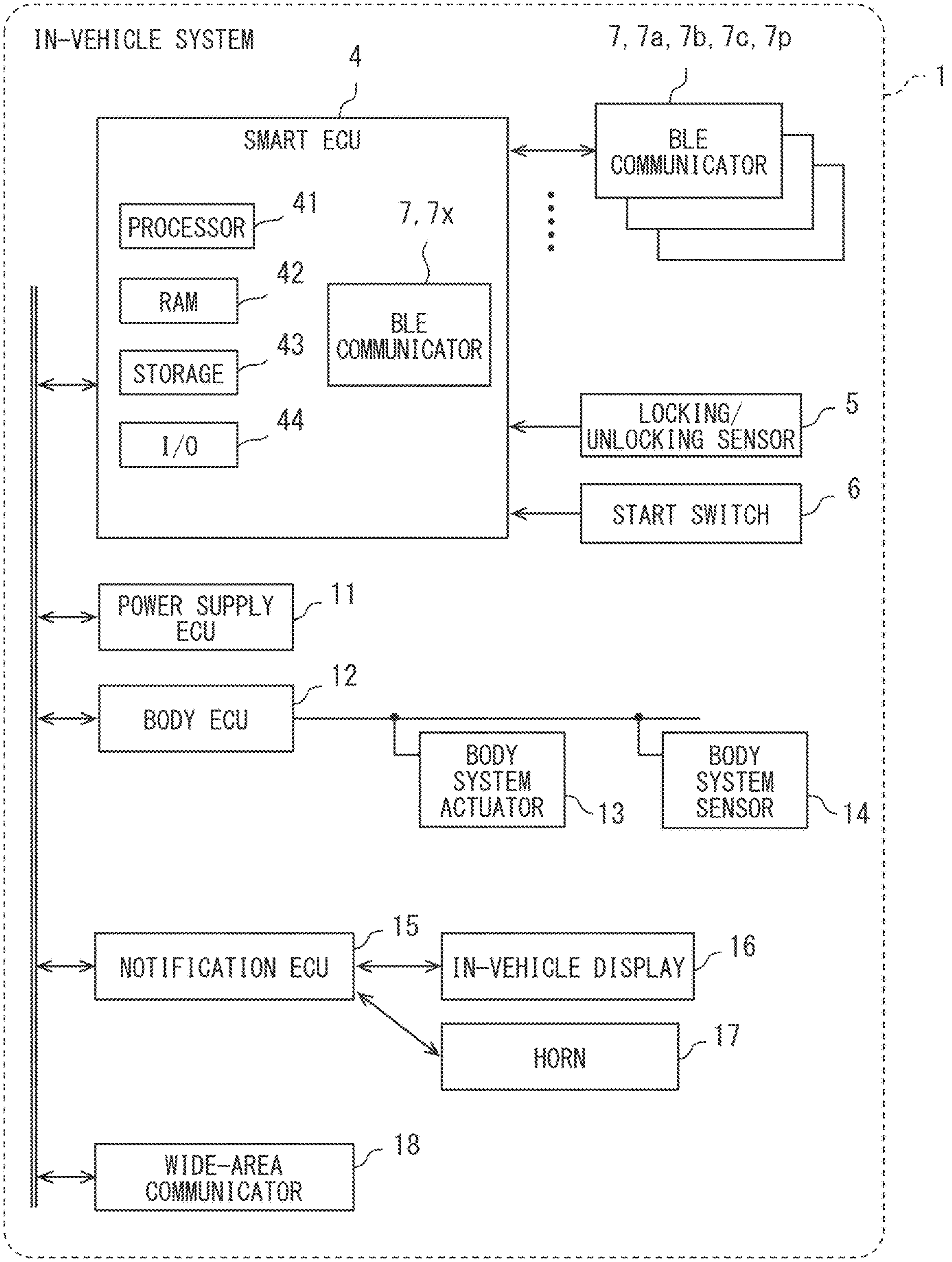
FIG. 4 is a block diagram illustrating a configuration of an in-vehicle system.

Here, the configuration and operation of the in-vehicle system 1 will be described. As illustrated in FIG. 4, the in-vehicle system 1 includes the smart ECU 4, a plurality of locking/unlocking sensor 5, a start switch 6, and a plurality of BLE communicators 7. The in-vehicle system 1 includes a power supply ECU 11, a body ECU 12, a body system actuator 13, a body system sensor 14, a notification ECU 15, an in-vehicle display 16, a horn 17, and a wide-area communicator 18.

The smart ECU 4 is connected to each of the locking/unlocking sensor 5, the start switch 6, and the BLE communicator 7 via a dedicated signal line. The smart ECU 4 is connected to the power supply ECU 11, the body ECU 12, and the like via an intra-vehicle network Nw so as to be able to communicate with each other. The intra-vehicle network Nw is a communication network constructed in the vehicle Hv. The standard of the intra-vehicle network Nw may be any standard. The connection form between the apparatuses illustrated in FIG. 4 is an example, and the specific connection form between the apparatuses can be changed as appropriate.

The smart ECU 4 is an ECU that determines a device location with respect to the vehicle Hv and performs vehicle control according to the determination result of the device location in cooperation with the BLE communicator 7 and the like. The device location in the present disclosure means the location of the portable device 2. Since the portable device 2 corresponds to the user, determining the device location corresponds to determining the location of the user. The smart ECU 4 is disposed in an instrument panel. The smart ECU 4 may be attached to the indoor side surface of the right or left C-pillar. The C-pillar is the third pillar from the front among the pillars included in the vehicle Hv.

The smart ECU 4 is implemented using a computer. That is, the smart ECU 4 includes a processor 41, a RAM 42, a storage 43, an input/output (I/O) 44, a bus line connecting these components, and the like. The smart ECU 4 of the present embodiment includes one BLE communicator 7 in a housing.

The storage 43 includes a nonvolatile storage medium such as flash memory. The storage 43 stores a control program executed by the processor 41. The control program includes a device location confirmation program that is a program for determining the location of the portable device 2. By accessing the RAM 42, the processor 41 executes various processes for implementing the functions of the functional units to be described later. The execution of the control program by the processor 41 corresponds to the execution of a vehicle control method corresponding to the control program. The I/O 44 is a circuit module for communicating with another apparatus.

The storage 43 stores a device ID for each portable device 2. The storage 43 stores communicator setting data indicating the mounting position of each BLE communicator 7 in the vehicle Hv. The mounting position of each BLE communicator 7 may be expressed as a point on a predetermined vehicle coordinate system. The vehicle coordinate system may be a two-dimensional coordinate system in which the X axis is parallel to the width direction of the vehicle Hv and the Y axis is parallel to the front-rear direction. The center of the vehicle coordinate system may be any location such as the center of the vehicle body or the attachment position of the smart ECU 4. Details of the smart ECU 4 will be separately described later.

The locking/unlocking sensor 5 is a touch sensor for the user to unlock and lock the door of the vehicle Hv. The locking/unlocking sensor 5 is provided on an outer door handle provided on each door. The outer door handle is a grip member provided on the outer surface of the door for opening and closing the door. The locking/unlocking sensors 5 are provided on all door handles including the door handle of the trunk. The locking/unlocking sensor 5 detects a touch by the user from a change in capacitance or a change in pressure, and outputs an electric signal indicating the touch to the smart ECU 4. The configuration for accepting at least one of the unlocking instruction or the locking instruction from the user may be a button/switch. The locking/unlocking button may be provided on each door handle instead of or together with the locking/unlocking sensor 5. The locking/unlocking sensor 5 of the present disclosure can be replaced with a locking/unlocking door button.

The start switch 6 is a push switch for the user to switch an on/off state of a traveling power source. The traveling power source is a power source for the vehicle Hv to travel, and is an ignition power source when the vehicle is an engine vehicle. When the vehicle Hv is an electric vehicle, the traveling power source may be a system main relay. When pushed by the user, the start switch 6 outputs an electric signal indicating this pushing to the smart ECU 4. The start switch 6 can be replaced with a start switch.

Figure 5:
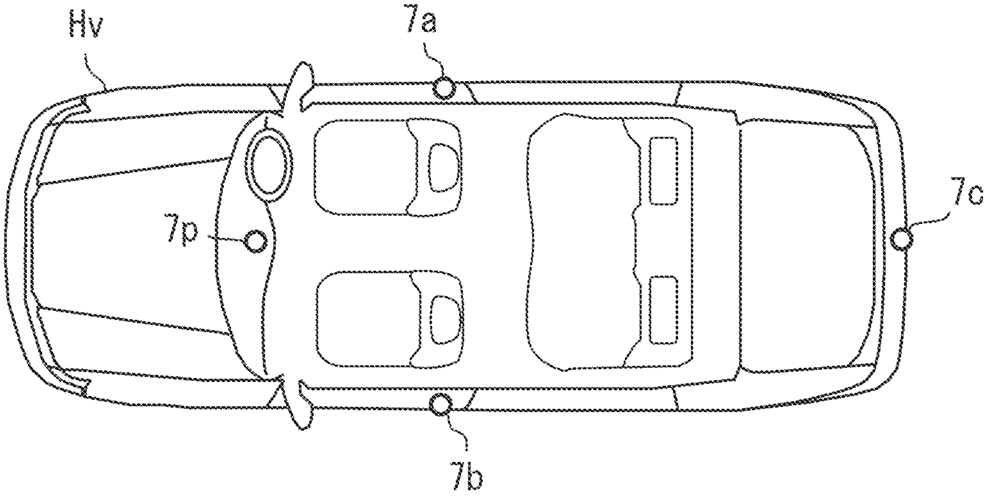
FIG. 5 is a diagram illustrating an example of a mounting position of a Bluetooth Low Energy (BLE) communicator.

The BLE communicator 7 is a communication module for performing BLE communication. A plurality of the BLE communicators 7 are provided in the vehicle Hv. As illustrated in FIG. 5, the in-vehicle system 1 of the present embodiment includes BLE communicators 7*a*, 7*b*, 7*c*, 7*p*, 7*x* as the BLE communicator 7. The BLE communicator 7*x* is built in the smart ECU 4, while the other BLE communicators 7 are disposed outside the smart ECU 4. Each of the BLE communicators 7 provided outside the smart ECU 4 is communicably connected to the smart ECU 4 via a dedicated communication line or the intra-vehicle network Nw.

Each BLE communicator 7 operates based on a control signal from the smart ECU 4. Each BLE communicator 7 provides the smart ECU 4 with received data and data related to a reception status of a signal from the portable device 2. In the present disclosure, a signal from the portable device 2 is also referred to as a device signal. A unique communicator number is set to each BLE communicator 7. The communicator number functions as information for identifying the plurality of BLE communicators 7.

The power supply ECU 11 is an ECU that controls the on/off state of the traveling power source mounted in the vehicle Hv. The power supply ECU 11 switches the traveling power source from OFF to ON based on a request signal from the smart ECU 4. When the vehicle Hv is an engine vehicle, the power supply ECU 11 starts the engine based on a request signal from the smart ECU 4.

The body ECU 12 is an ECU that controls the body system actuator 13 based on a request from the smart ECU 4 or the user. The body ECU 12 is communicably connected to various body system actuators 13 and various body system sensors 14. The body system actuator 13 here includes a door lock motor constituting a locking mechanism for each door. The body system sensor 14 includes a courtesy switch disposed for each door. The courtesy switch is a sensor that detects the opening and closing of a door. The body ECU 12 outputs a predetermined control signal to a door lock motor provided on each door of the vehicle Hv, based on a request from the smart ECU 4, thereby switching the locking mechanism for each door from the unlocked state to the locked state and performing the reverse control.

The notification ECU 15 uses the in-vehicle display 16 or the horn 17 to warn of the confinement of the portable device 2. Confinement means locking the vehicle with the portable device 2 inside the vehicle. Confinement is also referred to as in-locking or the like. The in-vehicle display 16 may be a liquid crystal display or an organic EL display. The in-vehicle display 16 is disposed in the center area of the instrument panel in the vehicle width direction or in the front area of the driver's seat. The horn 17 is an apparatus that outputs a warning sound toward the outside of the vehicle.

The notification ECU 15 displays a warning message on the in-vehicle display 16 or operates the horn 17 based on a request from the smart ECU 4. The warning message may be a message such as "The portable device remains in the trunk". The in-vehicle system 1 may include a speaker capable of outputting a voice message to the outside of the vehicle near the trunk door instead of/or in parallel with the horn 17. The in-vehicle system 1 may output a warning message by sound together with or instead of the warning sound.

The wide-area communicator 18 is a communication facility for connecting to a wide-area communication network using a cellular line or a Wi-Fi line. The wide-area communicator 18 may function as an interface for the smart ECU 4 to perform data communication with the DKS 3.

<Configuration of BLE Communicator>

Figure 6:
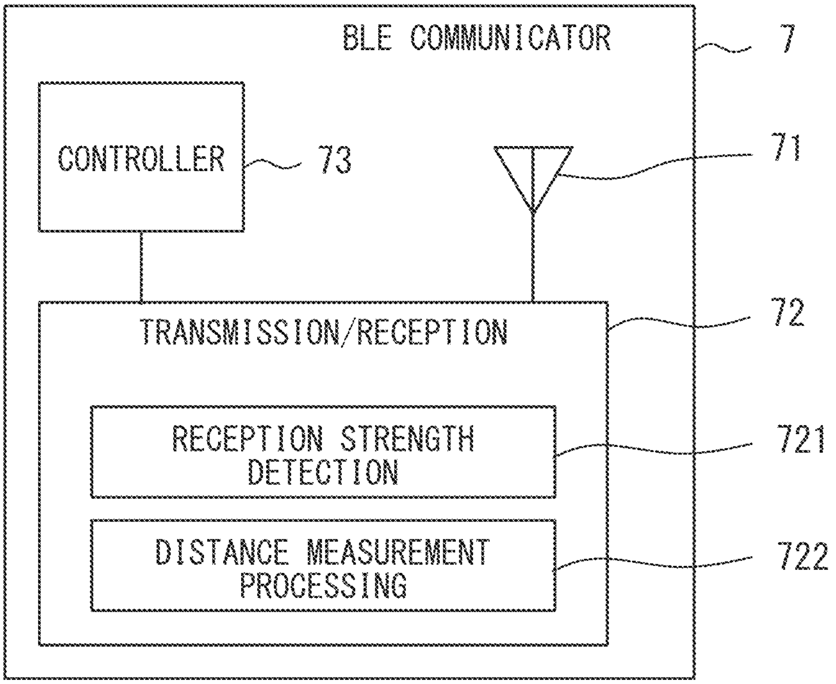
FIG. 6 is a diagram illustrating the configuration of the BLE communicator.

Here, the configuration of each BLE communicator 7 will be described. As illustrated in FIG. 6, each BLE communicator 7 includes an antenna 71, a transmission/reception unit 72, and a controller 73. The antenna 71 is a metal element for transmitting and receiving a radio wave in a frequency band used for BLE communication, that is, a 2.4-GHz band. The antenna 71 is electrically connected to the transmission/reception unit 72. The antenna 71 may be configured as an array antenna formed by arranging a plurality of antenna elements.

The transmission/reception unit 72 is a circuit module that performs signal processing related to at least one of BLE signal transmission or BLE signal reception. The transmission/reception unit 72 performs at least one of modulation, demodulation, frequency conversion, amplification, digital-analog conversion, and detection. The transmission/reception unit 72 may be an IC. The transmission/reception unit 72 is connected to the controller 73. The transmission/reception unit 72 includes a reception strength detection unit 721 and a distance measurement processing unit 722 in addition to the modulation/demodulation circuit.

The reception strength detection unit 721 is configured to sequentially detect the strength of the signal received by the antenna 71. The signal indicating the reception strength detected by the reception strength detection unit 721 or its measurement value itself can also be referred to as a received signal strength indicator/indication (RSSI). The reception strength detected by the reception strength detection unit 721 is output to the controller 73 together with the device ID indicating the transmission source of the received signal and the frequency information on the received signal.

The distance measurement processing unit 722 performs distance measurement communication with the communication partner to generate a distance measurement value indicating the distance from the BLE communicator 7 to the communication partner. The distance measurement value here is a parameter indicating the time of flight of a signal transmitted from the portable device 2 until the signal is received by the BLE communicator 7. The distance measurement value is a parameter different from the reception strength. Specifically, the distance measurement value is a round-trip time (RTT) or a two-frequency phase difference. The distance measurement communication can be rephrased as communication for measuring an RTT or a two-frequency phase difference. The distance measurement value indicates a signal time of flight (ToF) for one way or a round trip, and thus can be referred to as a ToF-related value.

The RTT is the time from the transmission of a response request signal to the communication partner to the reception of a response signal from the communication partner. The distance measurement processing unit 722 may use, as the RTT, a value obtained by performing a predetermined correction process such as subtracting, from an elapsed time between actual transmission and reception of a signal, an assumed value of a response processing time that occurs in the portable device 2, or an assumed value of a delay time that can occur in the BLE communicator 7. The two-frequency phase difference is a parameter identified by the transmission and reception of a continuous wave (CW) signal between the BLE communicator 7 and the portable device 2, and is a difference between transmission and reception phase differences observed at each of two frequencies. The two-frequency phase difference corresponds to a displacement amount of the transmission/reception phase difference due to a change in frequency.

The BLE communicator 7 performs distance measurement communication with the portable device 2 based on an instruction from the smart ECU 4, generates a distance measurement value, and reports the distance measurement value to the processor 41. In the present embodiment, as a more preferable mode, the distance measurement processing unit 722 calculates both the RTT and the two-frequency phase difference. In addition, the distance measurement processing unit 722 calculates the two-frequency phase difference for each combination of frequencies used for BLE communication. The generation (calculation) of the distance measurement value may be performed by the controller 73 or the smart ECU 4. The distance measurement processing unit 722 may identify the transmission/reception phase difference for each frequency, and the smart ECU 4 may calculate the two-frequency phase difference based on the transmission/reception phase difference for each frequency. The function sharing between the BLE communicator 7 and the smart ECU 4 can be changed as appropriate.

The controller 73 is a microcomputer that controls data transfer with the smart ECU 4. The controller 73 provides the received data input from the transmission/reception unit 72 into the smart ECU 4 sequentially or based on a request from the smart ECU 4. The controller 73 outputs data related to the reception status and the distance measurement value of a signal from the portable device 2 to the smart ECU 4, based on a request from the smart ECU 4 or voluntarily. The data indicating the reception status also includes the reception strength for each device ID and each frequency.

<Mounting Position and Role of BLE Communicator>

As illustrated in FIG. 5, the in-vehicle system 1 of the present embodiment includes BLE communicators 7*a*, 7*b*, 7*c*, 7*p*, 7*x*. The BLE communicator 7*a* is provided on an outer door handle for the driver's seat. The BLE communicator 7*b* is provided on an outer door handle for a passenger's seat. The BLE communicator 7*c* is provided near the trunk door. The BLE communicators 7*a*, 7*b*, 7*c* correspond to outdoor units that are the BLE communicators 7 disposed on the outer surface portion of the vehicle Hv. The BLE communicator 7*p* is the BLE communicator 7 disposed in the vehicle interior. The BLE communicator 7*p* may be disposed at the center of the instrument panel in the vehicle width direction. The BLE communicator 7*p* can be referred to as an indoor unit.

The BLE communicator 7*x* is the BLE communicator 7 incorporated in the smart ECU 4. The BLE communicator 7*x* is used for data communication with the portable device 2. In the present disclosure, the communicator used for data communication with the portable device 2 is also referred to as the gateway communicator. The gateway communicator may be rephrased as a representative machine, a data communicator, or the like. The BLE communicator 7*x* may be disposed outside the housing of the smart ECU 4. The setting of the gateway communicator may be dynamically changed by the smart ECU 4.

When receiving the advertisement signal from the portable device 2, the BLE communicator 7*x* automatically establishes a communication connection with the portable device 2 using the stored device information. After establishing the communication connection, the smart ECU 4 starts encrypted data communication with the portable device 2. When establishing a communication connection with the portable device 2, the BLE communicator 7*x* provides the processor 41 with the device ID of the portable device 2 being connected for communication as connected device information.

The smart ECU 4 uses the BLE communicators 7 other than the BLE communicator 7*x* as communicators for determining the device location (i.e., for location determination). In one aspect, the BLE communicator 7 for location determination corresponds to the BLE communicator 7 for measuring the distance to the portable device 2. The BLE communicator 7 for location determination is also referred to as an observer in the present disclosure. In the present embodiment, the BLE communicator 7*a*, the BLE communicator 7*b*, the BLE communicator 7*c*, and the BLE communicator 7*p* correspond to the observers. The observer can also be referred to as a distance measurer or a satellite communicator.

In BLE communication, data is transmitted and received while 37 channels are sequentially changed in a state where a communication connection between devices is established. That is, frequency hopping is performed during data communication after connection establishment. Therefore, normally, only the BLE communicator 7*x* connected for communication can capture a data signal from the portable device 2. The observer cannot observe the device signal. As a configuration corresponding to such a situation, the BLE communicator 7*x* of the present embodiment sequentially provides the smart ECU 4 with information indicating a channel to be used for communication with the portable device 2 (hereinafter, channel information).

The smart ECU 4 distributes the channel information and the device ID acquired from the BLE communicator 7*x* to each observer as reference information. The channel information indicated by the reference information enables each observer to recognize which channel among a large number of channels that can be used with the BLE can be received to receive the device signal. As a result, the observer can detect and report the reception strength and the like of the device signal without a communication connection.

In the present disclosure, a method of determining the device location based on a reception status of a signal transmitted from the portable device 2 to the gateway communicator at the observer is also referred to as a sniffing method. According to the sniffing method, it is possible to reduce the number of the BLE communicators 7, to which the portable device 2 is connected for communication, to a minimum of one. This enables a reduction in power consumption in the portable device 2. According to the sniffing method, indices indicating distances from the plurality of BLE communicators 7 to the portable device 2 can be collected in parallel. This can improve the system responsiveness to the approach of the user who possesses the portable device 2. Naturally, in another aspect, each BLE communicator 7 may individually perform bidirectional communication with the portable device 2 and transmit information such as reception strength and a distance measurement value to the smart ECU 4.

<Function of Smart ECU 4>

Figure 7:
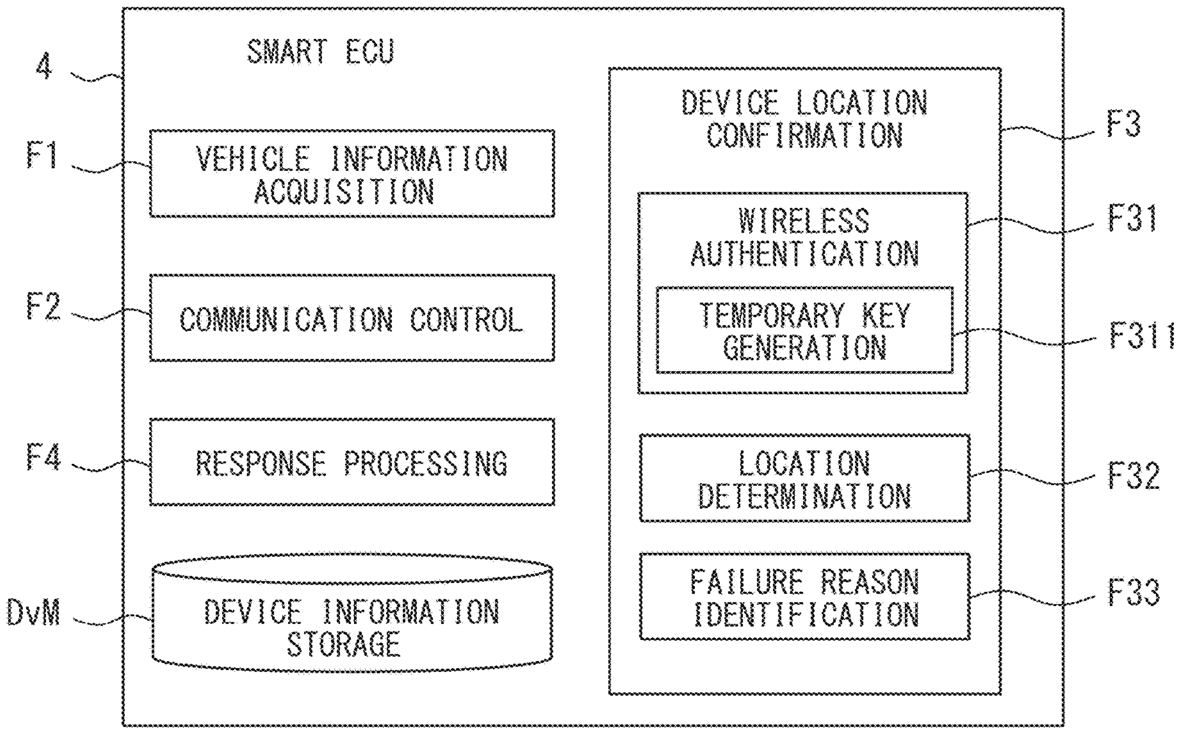
FIG. 7 is a functional block diagram of a smart electronic control unit (ECU)

Here, the functions and operations of the smart ECU 4 will be described. The smart ECU 4 provides functions corresponding to various functional blocks illustrated in FIG. 7 by executing a program stored in the storage 43. That is, the smart ECU 4 includes, as functional units, a vehicle information acquisition unit F1, a communication control unit F2, a device location confirmation unit F3, and a response processing unit F4. The smart ECU 4 includes a device information storage unit DvM.

The device information storage unit DvM is a storage medium for storing information on the portable device 2 used as the electronic key of the vehicle Hv. The device information storage unit DvM is implemented using a part of the storage area included in the storage 43. The device information storage unit DvM may be implemented using a nonvolatile storage medium physically independent of the storage 43. The device information storage unit DvM is configured such that the processor 41 can write, read, and delete data.

The device information storage unit DvM stores information on at least one portable device 2. The device information storage unit DvM stores the device ID of each portable device 2 in association with its service key, user ID, and the like. The user ID is an identifier for identifying each of a plurality of users and is set for each user.

The processor 41 acquires a service key, issued by the DKS 3 to a certain portable device 2, via the wide-area communicator 18 and stores the service key in the device information storage unit DvM in association with the device ID or the like of the portable device 2. The processor 41 may acquire data related to the service key, issued by the DKS 3, not via the wide-area communicator 18 but via the portable device 2 and store the data in the device information storage unit DvM. The device ID and the like of the portable device 2 are acquired and registered through the pairing process.

The vehicle information acquisition unit F1 acquires various pieces of vehicle information indicating the state of the vehicle Hv and the user's operation on the vehicle Hv from sensors, ECUs, switches, and the like mounted in the vehicle Hv. The vehicle information includes the state (on/off) of the traveling power source, the open/closed state of each door, the locked/unlocked state of each door, the user's operation states of the locking/unlocking sensor 5 and the start switch 6, the shift position, and the like. Acquiring an electric signal from the locking/unlocking sensor 5 or the start switch 6 corresponds to detecting user operations on these operation members. In one aspect, the vehicle information acquisition unit F1 corresponds to a configuration that detects the user's operations on the vehicle Hv, such as touching the locking/unlocking sensor 5, opening/closing the door, and pressing the start switch 6.

The communication control unit F2 controls the operation of the BLE communicator 7 included in the in-vehicle system 1. At the time of user/device registration to the smart ECU 4, the communication control unit F2 executes a key exchange protocol, so-called pairing and bonding, with the portable device 2 using the BLE communicator 7*x*. The device information, which is information on the portable device 2 acquired by pairing, is stored in the storage 43. The device information may also be stored in a nonvolatile memory included in the controller 73 of each BLE communicator 7. The device information may be a key for cryptographic communication/communication connection exchanged by pairing, a device ID, or the like.

The communication control unit F2 acquires the device ID of the portable device 2 being connected for communication from the BLE communicator 7*x*. The smart ECU 4 identifies a user present around the vehicle Hv based on the received device ID. When the vehicle Hv is shared by a plurality of users, device information for each of the portable devices 2 held by the respective users is stored. When the vehicle Hv is a service vehicle, the smart ECU 4 may acquire device information corresponding to the user reserved for use in advance from the DKS 3/another server cooperating therewith, and temporarily store the device information in a predetermined storage medium.

The communication control unit F2 receives the advertisement signal transmitted from the portable device 2 via the BLE communicator 7*x* to detect that the portable device 2 is present within a range where near-field communication with the in-vehicle system 1 is possible, and executes a sequence related to the communication connection. When the communication connection between the BLE communicator 7*x* and the portable device 2 has been established, the communication control unit F2 performs data communication with the portable device 2 using the BLE communicator 7*x*.

In addition, the communication control unit F2 acquires the reception strength for each frequency of the device signal and the distance measurement value from each BLE communicator 7. The observation data such as the reception strength and the distance measurement value provided from each of the plurality of BLE communicators 7 is stored in the RAM 42 in association with the device ID and the communicator ID of the provision source. The communication control unit F2 may cause each BLE communicator 7 to perform distance measurement communication with the portable device 2 to determine the device location.

The device location confirmation unit F3 is a module that determines the location of the portable device 2. The device location confirmation unit F3 in the present disclosure mainly determines whether the authenticated portable device 2 is present in the trunk. The device location confirmation unit F3 includes a wireless authentication unit F31, a location determination unit F32, and a failure reason identification unit F33 as sub-function units.

The wireless authentication unit F31 confirms (in other words, authenticates) the validity of the communication partner, that is, whether the communication partner is truly the portable device 2, in cooperation with the BLE communicator 7*x*. Communication for authentication is performed in an encrypted manner. As an example, the wireless authentication unit F31 of the present embodiment authenticates the portable device 2 (communication partner) by a challenge-response method using a challenge code and a one-time authentication key. A detailed sequence of the wireless authentication process will be separately described later. The wireless authentication unit F31 includes, as a further sub-function unit, a temporary key generation unit F311 that dynamically generates a one-time authentication key required in the wireless authentication process. The temporary key generation unit F311 is an optional element and may be omitted.

To improve security, the smart ECU 4 of the present embodiment determines that the communication partner is truly the portable device 2 only after the wireless authentication process succeeds, and executes various vehicle controls such as locking and unlocking. In other words, even if the communication partner is truly the portable device 2, in principle, the smart ECU 4 of the present embodiment does not cause the portable device 2 to function as the key of the vehicle Hv when the wireless authentication process is unsuccessful. However, as described later, this does not apply when the authentication failure reason is a specific reason.

The timing at which the wireless authentication unit F31 performs the wireless authentication process may be the timing at which the communication connection between the BLE communicator 7 and the portable device 2 is established. The wireless authentication unit F31 may be configured to perform the wireless authentication process at a predetermined cycle while the BLE communicator 7 and the portable device 2 are connected for communication.

The smart ECU 4 performs communication for the wireless authentication process, triggered by the execution of an operation of locking the vehicle Hv (hereinafter, locking operation). The locking operation may be an action of touching the locking/unlocking sensor 5 while the traveling power source is off and all the doors leading to the cabin are closed. A case where a locking instruction signal is received from the portable device 2 also corresponds to the case where the operation of locking the vehicle Hv is performed. The smart ECU 4 locks all the doors of the vehicle Hv based on the acceptance of the locking operation.

The smart ECU 4 accepts a touch on the locking/unlocking sensor 5 as a locking operation or an unlocking operation on condition that it has been confirmed that the authenticated portable device 2 is present in a locking/unlocking area. The locking/unlocking area is an area for the in-vehicle system 1 to lock/unlock the doors, and is an area outside the cabin within a predetermined distance (e.g., 1.5 m) from each door. The authenticated portable device 2 is the portable device 2 for which the wireless authentication process has succeeded.

Furthermore, the smart ECU 4 performs the wireless authentication process on the communication partner present in the trunk, triggered by the closing of the trunk door in a situation where the vehicle Hv is locked and only the trunk door is open. The state in which the vehicle Hv is locked is a state in which the locking mechanisms for all the doors included in the vehicle Hv are set to the locked state. The locking mechanism for the trunk door is configured to be settable to the locked state even when the trunk door is open. When the trunk door is closed after the locking mechanisms for all the doors are set to the locked state while the trunk door is left open, the latch of the trunk door is fixed, and the trunk door cannot be opened.

The state in which the vehicle Hv is locked can include a door closing standby state. The door closing standby state is a state in which locking is completed as soon as the door, which is open at the timing when the locking operation is accepted, is closed. The door closing standby state also includes a trunk closing standby state in which only the trunk door is open with the locking mechanisms for all the doors set to the locked state as described above. The door closing standby state can include a state in which the locking of the vehicle Hv is reserved using a reserved locking function. The reserved locking function is a function of accepting a locking operation while the doors are open, and locking all the doors triggered by the closing of all the doors. In this manner, the door closing standby state corresponds to a state in which the locking operation of the user has been accepted.

In addition, the wireless authentication unit F31 may perform communication for the wireless authentication process triggered by the pressing of the start switch 6 or the touching of the locking/unlocking sensor 5 by the user in a state where the vehicle Hv is locked.

The location determination unit F32 determines the device location based on the reception status of the device signal in each BLE communicator 7. The location determination unit F32 combines the distance measurement values of the plurality of BLE communicators 7 and the mounting positions of the respective BLE communicators 7 on the vehicle Hv to identify the location coordinates with respect to the vehicle Hv. Since the installation position of each BLE communicator 7 is known, if the distance from three or more BLE communicators 7 to the portable device 2 can be acquired, the location coordinates of the portable device 2 can be calculated using the principle of triangulation or trilateration. The location coordinates of the portable device 2 can be expressed in a vehicle coordinate system or the like.

Based on the identified device location coordinates, the location determination unit F32 determines whether the portable device 2 is present in the trunk and whether the portable device 2 is present in a trunk locking/unlocking area. The trunk locking/unlocking area is a locking/unlocking area formed around the trunk door handle, and is an area that is within a predetermined distance (e.g., 1.5 m) from the trunk door handle outside the vehicle.

The location determination unit F32 is configured not to perform location determination on an unregistered device to reduce a processing load. The location determination unit F32 may perform location determination only on a device that is connected for communication or a device that can receive a BLE signal among the registered devices. As the location determination target is narrowed down, the processing load of the processor 41 can be reduced and power can be saved.

When the wireless authentication process for the portable device 2 fails, the failure reason identification unit F33 identifies the authentication failure reason that is the reason for the failure based on the data received from the portable device 2. Examples of the authentication failure reasons include a mismatch between a response code and a verification code and non-receipt of a response from the portable device 2, which will be described later. The reasons for cases where the wireless authentication process fails, even though the device is a registered device, include user non-authentication, a left state, authentication key shortage, and the like. The user non-authentication, the left state, and the authentication key shortage will be separately described later. The user non-authentication, the left state, and the authentication key shortage correspond to specific reasons. Mismatch between the response code and the verification code, non-receipt of a response from the portable device 2, and the like correspond to other reasons.

In response to a user operation on the vehicle Hv, the response processing unit F4 cooperates with another ECU to execute control/processes according to the device location identified by the device location confirmation unit F3. The response processing unit F4 performs one or both of a confinement warning process and a residual device invalidation process. The confinement warning process is vehicle control of outputting a predetermined warning sound or the like when it is detected that the key device remains in the trunk at the time of accepting the locking operation. When the condition for executing the confinement warning process is satisfied, the response processing unit F4 transmits a signal for requesting the notification ECU 15 to output a warning sound or the like.

The residual device invalidation process is vehicle control of invalidating a key device left in the vehicle when an operation to lock the vehicle Hv. The invalidation means temporarily disabling the key to function as a key for locking and unlocking the vehicle Hv, and the like. The invalidation can be implemented by excluding the communication device from the communication partner or by setting the communication device not to be subjected to the wireless authentication process. Details of the confinement warning process and the residual device invalidation process will be separately described later.

In addition, when the device location confirmation unit F3 has determined that the portable device 2 is present in the locking/unlocking area and the user's touch on the locking/unlocking sensor 5 is detected, the response processing unit F4 locks or unlocks the door in cooperation with the body ECU 12. When the device location confirmation unit F3 has determined that the portable device 2 is present in the cabin and the user's press on the start switch 6 is detected, the response processing unit F4 switches the traveling power source from OFF to ON in cooperation with the power supply ECU 11.

The response processing unit F4 of the present embodiment cooperates with another ECU to perform user notification such as warning, locking, unlocking, turning on/off of the traveling power source, and the like, but the present invention is not limited thereto. The smart ECU 4 as the response processing unit F4 may be configured to directly control electrical equipment related to user notification, locking, unlocking, and the like. Outputting a control signal for executing a certain vehicle control to another ECU is also included in executing the vehicle control.

<Wireless Authentication Process>

Figure 8:
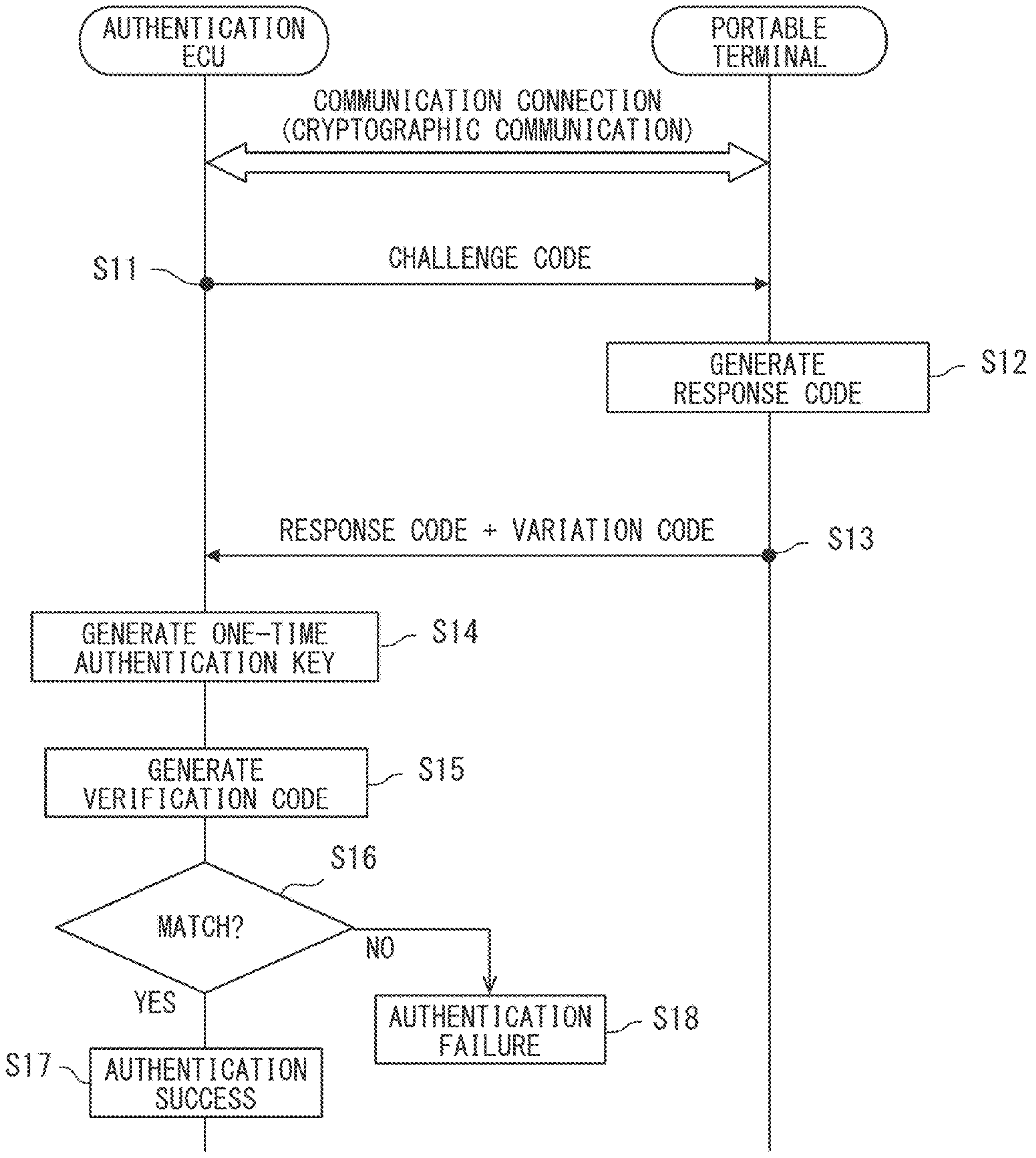
FIG. 8 is a sequence diagram illustrating a flow of a wireless authentication process.

Here, a sequence of processes in which the smart ECU 4 authenticates the portable device 2 as the communication partner will be described. The wireless authentication process for the portable device 2 by the smart ECU 4 may include steps S11 to S18 as illustrated in FIG. 8. The wireless authentication process is executed on the assumption that the encrypted BLE communication link between the portable device 2 and the smart ECU 4 has been established.

The fact that a BLE communication link has been established implies that the communication partner is the paired portable device 2. Assuming that authentication for communication connection is a primary authentication process that is a first-stage authentication process, the wireless authentication process corresponds to a secondary authentication process that is a second-stage authentication process.

Step S11 is a step of transmitting a challenge code from the smart ECU 4 to the portable device 2. The challenge code may be a random number that has a predetermined length and is generated using a random number table prepared in advance. The challenge code may be a random number generated using time information (so-called system time) included in the smart ECU 4 as SEED. The challenge code may be determined in various ways.

Step S12 is a step in which the portable device 2 generates a response code by combining an arbitrary one-time authentication key stored in the device information storage unit DvM and the received challenge code by a predetermined method. The used one-time authentication key is discarded at any time. Step S13 is a step in which the portable device 2 collectively/separately returns the response code generated in step S12 and the variation code, corresponding to the one-time authentication key used to generate the response code, to the smart ECU 4.

Step S14 is a step in which the smart ECU 4 generates a one-time authentication key using the variation code received from the portable device 2 and the service key corresponding to the communication partner and stored in the device information storage unit DvM. Here, the combination of the service key and the variation code used by the smart ECU 4 to generate the one-time authentication key is the same as the generation material of the one-time authentication key used to generate the response code. Therefore, the one-time authentication key generated by the smart ECU 4 in step S14 is the same as the one-time authentication key used by the portable device 2 to generate the response code. Such step S14 corresponds to a process of restoring the one-time authentication key, used by the portable device 2 to generate the response code, based on the variation code received from the portable device 2 and the service key of the portable device 2 held by itself.

In step S15, the smart ECU 4 generates a verification code based on the one-time authentication key generated in step S14 and the challenge code transmitted in step S11. The verification code generation method itself is the same as the response code generation. When the communication partner is the portable device 2 holding the service key registered in the device information storage unit DvM, the verification code and the response code can be expected to match. When the communication partner is an unregistered device, the response code is not returned, or the response code and the verification code do not match. Therefore, the response code generated/received as described above functions as information for verifying the validity of the communication partner.

In step S16, the smart ECU 4 compares the verification code generated in step S15 with the response code received from the portable device 2 to determine the validity of the communication partner. When the two codes match, the smart ECU 4 determines that the authentication has succeeded (step S17). On the other hand, when the two codes differ from each other, the smart ECU 4 determines that the authentication has failed (step S18). When the response code is not returned even after a predetermined response standby time has elapsed from the transmission of the challenge code, the smart ECU 4 may determine that the authentication has failed. The smart ECU 4 of the present disclosure may also determine that the authentication has failed when an authentication disable signal to be described later is received from the portable device 2 instead of the response code.

The in-vehicle system 1 authenticates the portable device 2 and the user by using a one-time authentication key that is generated for each portable device 2 based on a unique service key. This can enhance the security compared to that in a configuration where the portable terminal is authenticated using fixed key information. According to the above method, the information exchanged between the smart ECU 4 and the portable device 2 at the time of generating the response code is the variation code and the challenge code. At the time of authentication, the one-time authentication key itself is not transmitted and received between the authentication ECU and the portable terminal. The one-time authentication key used for authentication is changed each time. Therefore, according to the above method, it is possible to reduce the possibility that a third party illegally succeeds in the wireless authentication process. Here, the third party is a person who is not the user of the vehicle Hv.

The authentication sequence described above is an example, and the present invention is not limited thereto. The operation of each device may be designed such that the one-time authentication keys used to generate the response code/verification code are the same between the portable device 2 and the smart ECU 4. In a configuration where the smart ECU 4 and the portable device 2 hold a plurality of common one-time authentication keys, the smart ECU 4 may notify the portable device 2 of the number of the one-time authentication key used for the wireless authentication process.

<Device Response Process>

Figure 9:
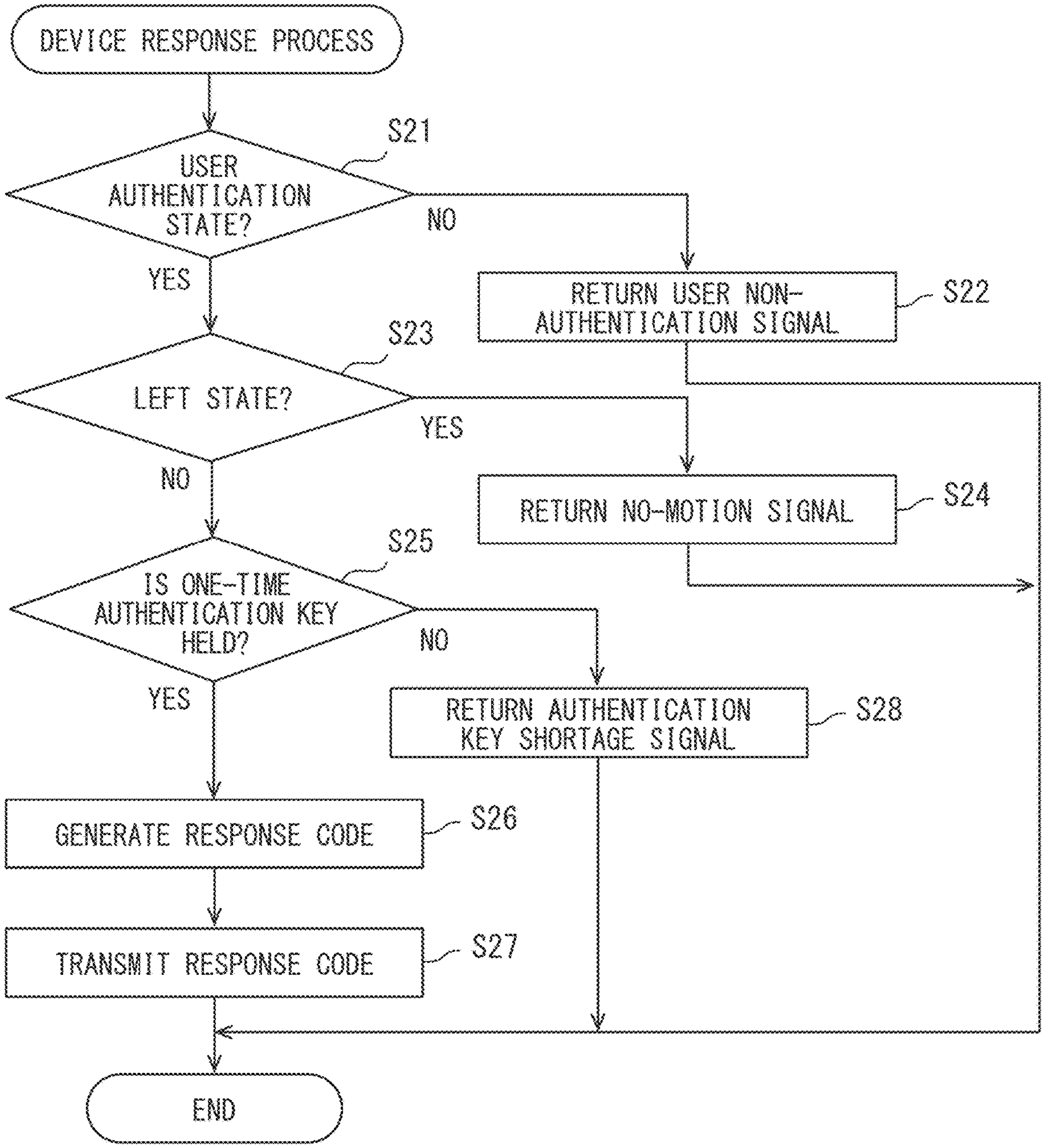
FIG. 9 is a flowchart for explaining the operation of the portable device.

Here, as the device response process, the operation of the portable device 2 when the challenge code is received will be described with reference to FIG. 9. When receiving the challenge code from the vehicle Hv, the portable device 2 determines whether its state is the user authentication state (S21). Here, when the state is not the user authentication state, that is, when the user is not logged in to the digital key application 204 (NO in S21), the portable device 2 returns a user non-authentication signal to the vehicle Hv (S22). The user non-authentication signal is a BLE signal that includes a code indicating that the state is not the user authentication state. The user non-authentication signal corresponds to a response signal indicating that a response cannot be made to the wireless authentication process or the response code is not returned.

In the case of the user authentication state (YES in S21), the portable device 2 determines whether the current state of the portable device 2 corresponds to the left state based on the signal from the acceleration sensor 23 (S23). When the current state of the portable device 2 corresponds to the left state (YES in S23), the portable device 2 returns a no-motion signal to the vehicle Hv (S24). The no-motion signal is a BLE signal that includes a code indicating a left state. The no-motion signal corresponds to a response signal indicating that a response cannot be made to the wireless authentication process or a response code is not returned.

When the state is not the left state (NO in S23), the portable device 2 determines whether at least one one-time authentication key remains in the key information storage unit KyM (S25). When at least one one-time authentication key remains in the key information storage unit KyM (YES in S25), the portable device 2 generates a response code using any one of the remaining one-time authentication keys (S26) and returns the response code to the vehicle Hv (S27). Steps S26 to S27 are a sequence corresponding to steps S12 to S13 in FIG. 8.

On the other hand, when no one-time authentication key remains in the key information storage unit KyM, an authentication key shortage signal is returned to the vehicle Hv (S28). The authentication key shortage signal is a BLE signal that includes a code indicating an authentication key shortage state in which the one-time authentication key is insufficient. The authentication key shortage signal corresponds to a response signal indicating that a response cannot be made to the wireless authentication process or a response code is not returned.

As described above, when receiving the challenge code, the portable device 2 performs a response according to whether the user has been authenticated, whether the state is the left state, and whether the one-time authentication key is held. In the present disclosure, the user non-authentication signal, the no-motion signal, and the authentication key shortage signal are also collectively referred to as an authentication disable signal. When receiving the authentication disable signal such as the user non-authentication signal, the smart ECU 4 determines that the authentication has failed (not succeeded). When receiving the user non-authentication signal from the communication partner, the failure reason identification unit F33 determines that the authentication failure reason is the user non-authentication. When receiving the no-motion signal from the communication partner, the failure reason identification unit F33 determines that the authentication failure reason is the left state. When the authentication failure signal is received, the failure reason identification unit F33 determines that the authentication failure reason is authentication key shortage.

The portable device 2 may transmit the authentication disable signal not only when the challenge code is received but also before the reception of the challenge code, such as at the timing when the BLE communication link is established. The device control unit 20 may transmit the authentication disable signal or the like as a response to the response request signal from the smart ECU 4, or may voluntarily transmit the authentication disable signal at any timing after the establishment of the BLE communication link. The timing for transmitting the authentication disable signal can be changed as appropriate.

When the authentication disable reason is resolved after the transmission of the authentication disable signal, the device control unit 20 may transmit a ready signal to the smart ECU 4, indicating that it is now ready for the wireless authentication process. The authentication disable reason is, for example, the one-time authentication key shortage, the left state, the user non-authentication, or the like. When receiving the ready signal, the smart ECU 4 may transmit the challenge code to the transmission source of the ready signal and execute the wireless authentication process.

<Confinement Warning Process>

Figure 10:
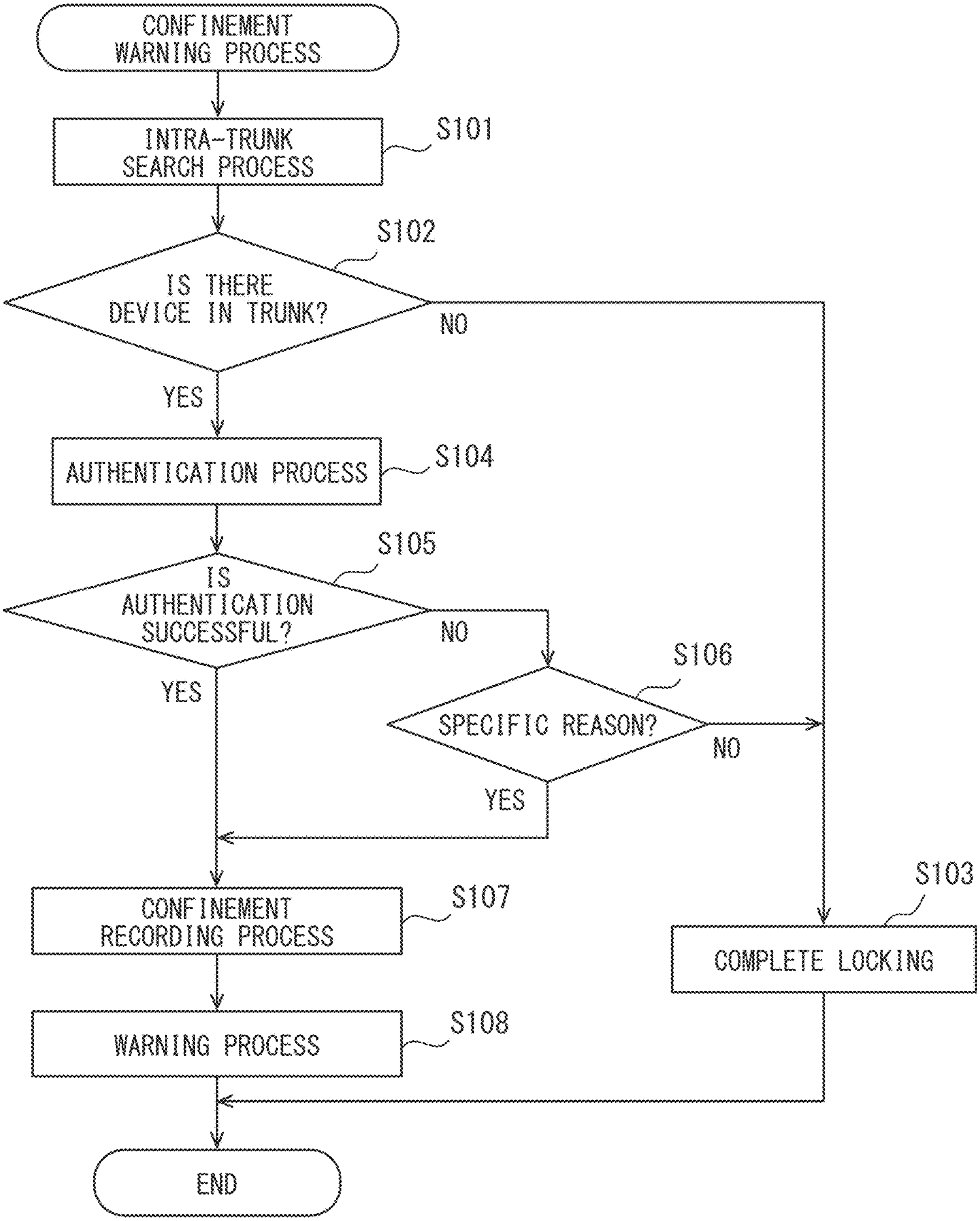
FIG. 10 is a flowchart of a confinement warning process.

Here, the confinement warning process performed by the smart ECU 4 will be described with reference to a flowchart illustrated in FIG. 10. The confinement warning process may be executed, triggered by the closing of the trunk door in the door closing standby state. The confinement warning process includes steps S101 to S108 as an example.

Step S101 is a step in which the device location confirmation unit F3 determines whether the portable device 2 is present in the trunk, as an intra-trunk search process. In step S101, the device location confirmation unit F3 causes each of the BLE communicators 7 to perform distance measurement communication with the portable device 2, thereby identifying device location coordinates and determining whether the portable device 2 is present in the trunk. The search process can be executed for the portable device 2 paired with the smart ECU 4. Step S101 corresponds to the location determination process.

When the portable device 2 is not found in the trunk as a result of the intra-trunk search process in step S101 (NO in S102), the smart ECU 4 determines that the portable device 2 confined in the trunk is not present, and the smart ECU 4 completes the locking (S103). In this case, special control such as a warning process is not performed. The state in which the locking is completed may be a state in which all the doors including the trunk door are closed and locked.

On the other hand, when determining that the registered device is present in the trunk (YES in S102), the smart ECU 4 executes a wireless authentication process for the intra-trunk device (S104). The intra-trunk device may be the portable device 2 present in the trunk.

When the wireless authentication process for the intra-trunk device succeeds (YES in S105), the smart ECU 4 performs a confinement recording process (S107). The confinement recording process is a process for maintaining the presence of the portable device 2 confined in the trunk as the internal state. The confinement recording process includes setting a trunk closing flag to ON and saving the device ID of the intra-trunk device as confined device information in the storage 43 or the like. The trunk closing flag is a flag indicating whether a confined device is present. The confined device means the portable device 2 that is confined in the trunk.

When the wireless authentication process for the intra-trunk device fails (NO in S105), the smart ECU 4 of the present embodiment identifies the authentication failure reason, which is the reason for the failure, based on the received data of the device. It is determined whether the authentication failure reason corresponds to any of the user non-authentication, the left state, and the authentication key shortage (S106).

If the authentication failure reason is any of the user non-authentication, the left state, and the authentication key shortage (YES in S106), the smart ECU 4 considers that the portable device 2 is present in the trunk, and performs the confinement recording process as in the case where the wireless authentication process succeeds (S107). On the other hand, when the wireless authentication process for the intra-trunk device fails for any other reason (NO in S106), the smart ECU 4 locks the vehicle (S103).

When the smart ECU 4 detects that the portable device 2 is confined in the trunk, the smart ECU 4 performs the warning process in cooperation with the notification ECU 15 (S108). The warning process may include at least one of outputting a predetermined warning sound from the horn 17 or displaying a warning message on the in-vehicle display 16. By performing the warning process, the user can recognize that he or she has inadvertently placed the portable device 2 in the trunk.

Figure 11:
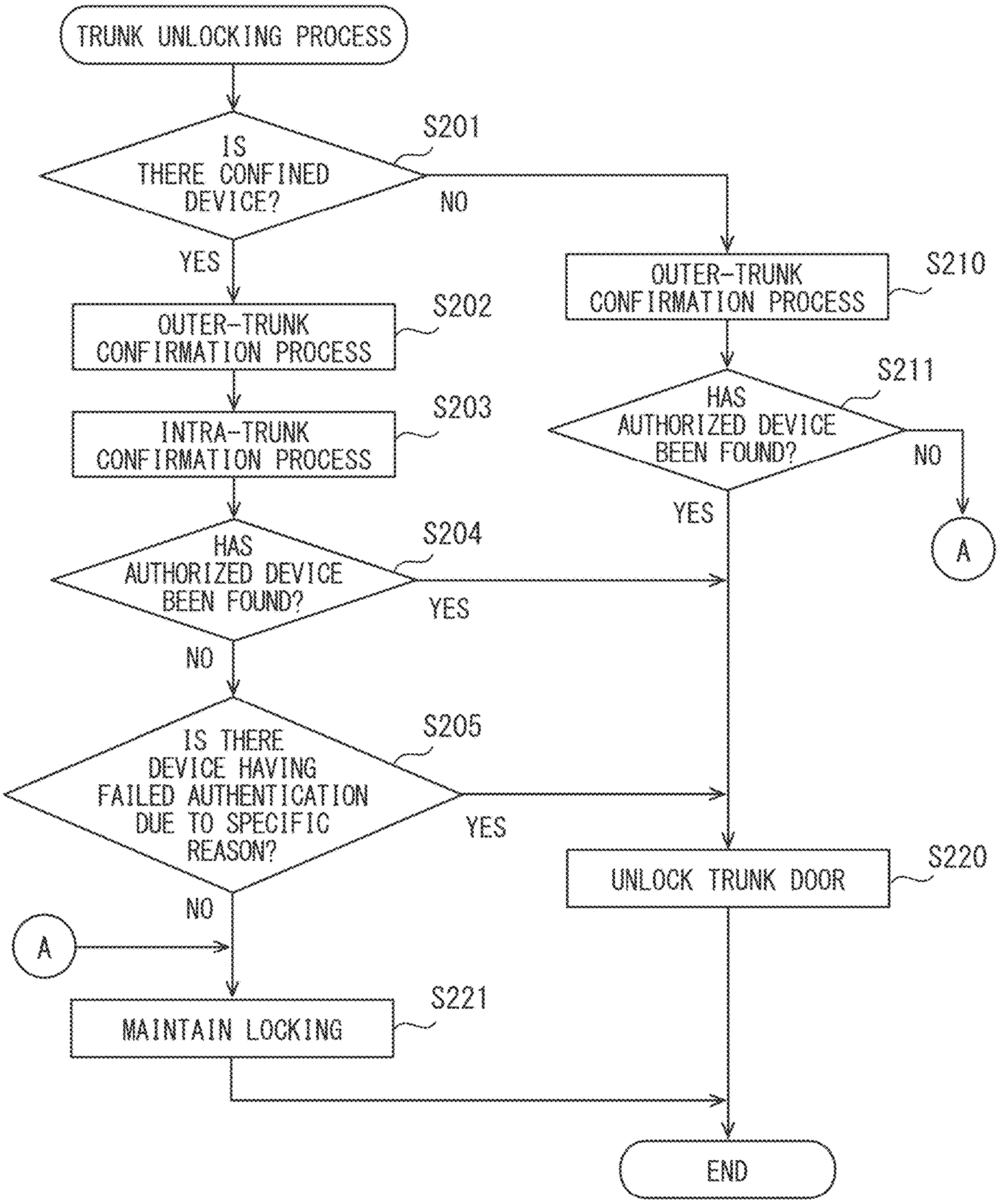
FIG. 11 is a flowchart of a trunk unlocking process.

Next, a trunk unlocking process will be described with reference to a flowchart illustrated in FIG. 11. The trunk unlocking process is a control process for unlocking the trunk door. The trunk unlocking process is performed based on the fact that the locking/unlocking sensor 5 provided on the trunk door is touched by the user in a state where the locking of the vehicle Hv is completed. The trunk unlocking process illustrated in FIG. 11 can be performed as a subsequent process of step S103 or step S108 in FIG. 10.

Step S201 is a step of determining whether a confined device is present with reference to a record in the storage 43 or the like. When the presence of the confined device is recorded (YES in S201), the smart ECU 4 sequentially/simultaneously executes an outer-trunk confirmation process and an intra-trunk confirmation process (S202 to S203). The outer-trunk confirmation process is a process of determining whether the portable device 2 is present in the trunk locking/unlocking area, and includes a device location determination process and a wireless authentication process. The intra-trunk confirmation process is a process of determining whether the portable device 2 is present in the trunk, and includes a location determination process and a wireless authentication process. The intra-trunk confirmation process as step S203 corresponds to an open-time confirmation process.

Step S204 is a step of determining whether the portable device 2 has been found in the trunk or the trunk locking/unlocking area as a result of steps S202 to S203. The case where the portable device 2 has been found corresponds not only to the case where the portable device 2 is present but also to the case where the wireless authentication process for the portable device 2 has succeeded. When the portable device 2 is found in the trunk or in the trunk locking/unlocking area, the trunk door is unlocked (S220).

When the portable device 2 is not found in the trunk or the trunk locking/unlocking area, it is determined whether the portable device 2 for which the wireless authentication process has failed due to a specific reason is present in the trunk or the trunk locking/unlocking area (S205). When the portable device 2 for which the wireless authentication process has failed due to the specific reason is present in the trunk or the trunk locking/unlocking area (YES in S205), the smart ECU 4 unlocks the trunk door (S220).

When no authorized device is found in the trunk or the trunk locking/unlocking area and there is no portable device 2 for which the wireless authentication process has failed due to the specific reason (NO in S205), the smart ECU 4 maintains a state in which the trunk door is locked (S221). The authorized device is the portable device 2 for which wireless authentication has succeeded. When the confined device is not present (NO in S201), the smart ECU 4 executes only the outer-trunk confirmation process without executing the intra-trunk confirmation process (S210). When an authorized device is found in the trunk locking/unlocking area, the smart ECU 4 unlocks the trunk door (S220).

According to the above configuration, in the trunk closing standby state, the user can unlock the trunk even if the trunk door is closed with the portable device 2 being inadvertently placed in the trunk and the wireless authentication fails due to the specific reason such as the authentication key shortage. According to the trunk unlocking process illustrated in FIG. 11, when the portable device 2 is confined in the trunk, a person other than the user can open the trunk door by touching the trunk locking/unlocking sensor 5. However, in the case described above, the confinement warning process is performed as soon as the trunk door is closed. Thus, when the portable device 2 is confined in the trunk, the user performs the above trunk unlocking operation before leaving the vehicle Hv. That is, the trunk unlocking process illustrated in FIG. 11 operates such that only the user can actually unlock the trunk door.

<Residual Device Invalidation Process>

Figure 12:
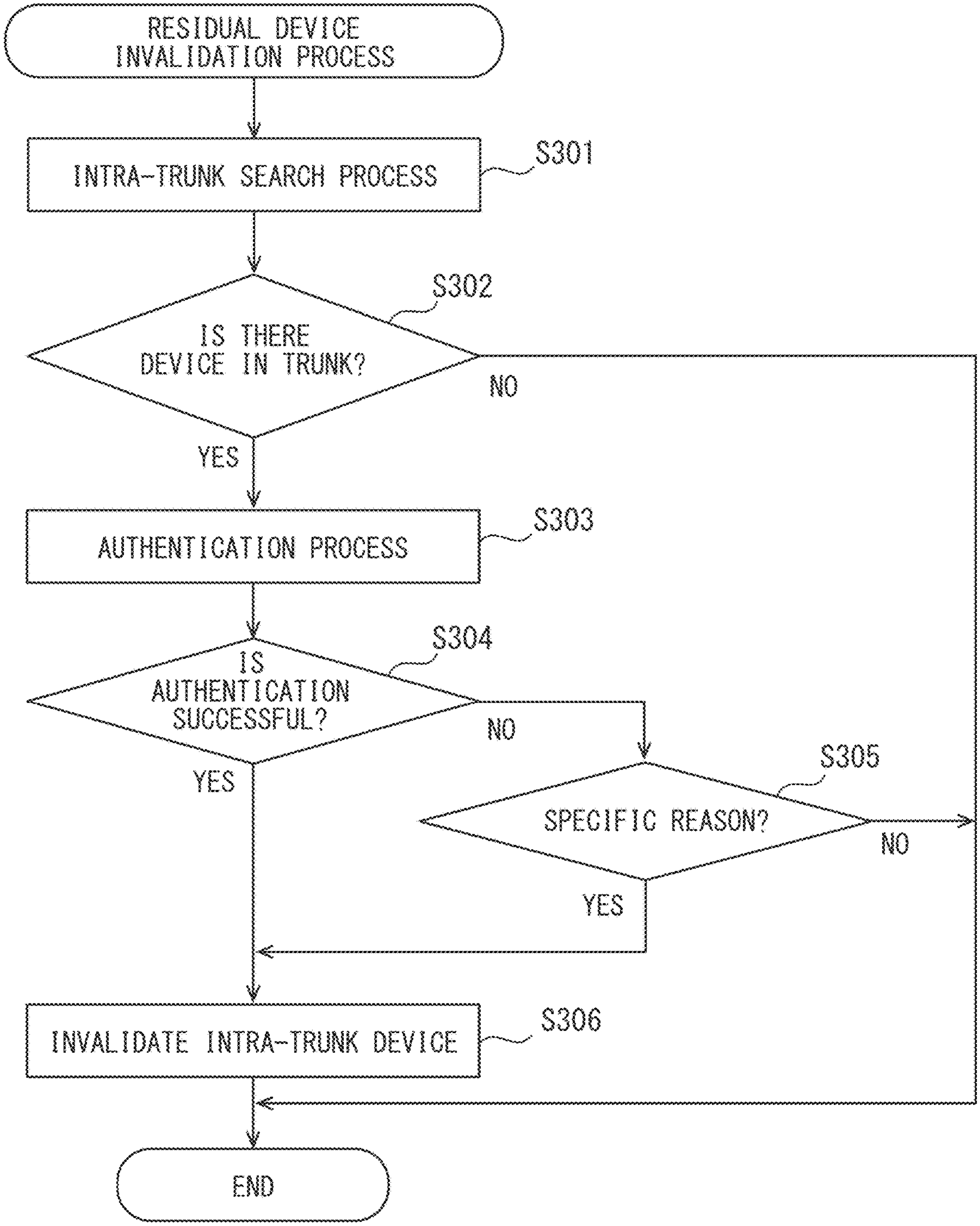
FIG. 12 is a flowchart of a residual device invalidation process.

Here, a residual device invalidation process will be described with reference to a flowchart illustrated in FIG. 12. The residual device invalidation process is a process of invalidating the portable device 2 left in the trunk at the timing when the locking operation is accepted. The smart ECU 4 performs the residual device invalidation process when accepting a locking operation while the traveling power source is off and all the doors are closed. The case where the locking operation is accepted is specifically a case where a locking instruction signal is accepted. The case where the locking operation is accepted may also include a case where the locking/unlocking sensor 5 is pressed in a situation where the presence of an authorized device in the locking/unlocking area has been confirmed.

The confinement warning process described above is a process corresponding to a case where the user accidentally confines the portable device 2 in the vehicle (in the trunk), whereas the residual device invalidation process is a process corresponding to a case where the user intentionally confines the portable device 2 in the trunk. From the viewpoint of the execution condition, there may be a difference between the processes in that the execution of the confinement warning process is triggered by the door closing after the locking operation, whereas the execution of the residual device invalidation process is triggered by the reception of the locking operation. The residual device invalidation process includes steps S301 to S306 as an example.

Similarly to step S101, step S301 is a step in which the device location confirmation unit F3 determines whether the portable device 2 is present in the trunk. When the portable device 2 present in the trunk is found (YES in S302), the smart ECU 4 performs a wireless authentication process for the intra-trunk device (S303). When the portable device 2 is not found in the trunk (NO in S302), the present flow ends.

When the wireless authentication process for the intra-trunk device has succeeded (YES in S304), the smart ECU 4 invalidates the intra-trunk device (S306). Specifically, data indicating that the intra-trunk device cannot be used for unlocking is stored in the storage 43 or the like.

When the wireless authentication process for the intra-trunk device fails (NO in S304), the smart ECU 4 identifies the reason for the failure based on the received data of the device. It is determined whether the authentication failure reason corresponds to any of the user non-authentication, the left state, and the authentication key shortage (S305).

If the authentication failure reason is any of the user non-authentication, the left state, and the authentication key shortage (YES in S305), the smart ECU 4 considers that the portable device 2 as an authorized device is present in the trunk, and invalidates the intra-trunk device (S306). That is, when the authentication failure reason corresponds to the specific reason, the smart ECU 4 performs a process similar to the one performed when the wireless authentication process has succeeded. On the other hand, when the wireless authentication process for the intra-trunk device fails for any other reason (NO in S305), the smart ECU 4 ends the present flow without invalidating the intra-trunk device.

According to the above configuration, since the portable device 2 placed in the trunk by the user before the locking operation is invalidated, the wireless authentication process does not succeed even if the intra-trunk confirmation process is executed, triggered by the touching of the trunk locking/unlocking sensor 5. This can prevent a third party from illegally opening the trunk. Since the residual device invalidation process is executed, triggered by the locking operation in a state where all the doors are closed, it is assumed that the user possesses a portable device 2 different from the confined device. That is, even if the confined device is invalidated, the user can unlock the vehicle Hv without any problem using the different portable device 2.

<Summary of Operation and Effects of Smart ECU 4>

In a general PEPS system, when the wireless authentication process is unsuccessful, vehicle control according to the location of the portable device 2 is not executed. However, if the execution condition and the authentication method of the wireless authentication process become complicated/strict, the possibility of determining that the portable device 2 is not present in the trunk increases even if the portable device 2 is actually present in the trunk. As a result, the number of cases in which control according to the device location is inoperative may increase. A similar problem may occur when the portable device 2 is configured, for improved security, not to return a response code when in the left state.

In response to such a problem, according to the configuration of the present embodiment, even if the wireless authentication process for the communication partner fails, when the failure reason is a specific reason, the portable device 2 is considered to be present in the trunk on condition that the communication partner is a registered device. As a result, the risk of failing to invalidate the confined device or the inoperability of the confinement warning process can be reduced.

As the comparative configuration, a configuration is conceivable in which the communication partner that has failed in the wireless authentication process is considered not to be an authorized device regardless of the reason for the authentication failure. In such a comparative configuration, if the authentication of the intra-trunk device fails, the smart ECU 4 cannot recognize that the portable device 2 is present in the trunk. As a result, the comparative configuration confines the portable device 2 in the trunk against the user's intention. Furthermore, in the comparative configuration, the portable device 2 intentionally left in the trunk cannot be invalidated.

The reason for the failure of the authentication key shortage may be resolved by the portable device 2 acquiring a one-time authentication key from the DKS 3 with the lapse of time. The portable device 2 left in the trunk may acquire a one-time authentication key from the DKS 3 over time and return to an authenticatable state. When the portable device 2 left in the trunk and not invalidated returns to an authenticatable state, a third party can unlock the trunk. According to the present embodiment, the problem of the comparative configuration can be alleviated/solved.

The case where the authentication of the intra-trunk device fails due to the authentication key shortage includes a case where the portable device 2 that has used up the one-time authentication key in the wireless authentication process for locking is placed in the trunk and the trunk door is closed. Originally, the portable device 2 should operate to replenish the one-time authentication key from the DKS 3 before the remaining number of the one-time authentication key becomes one. However, depending on the communication environment, the communication setting of the portable device 2, the maintenance of the DKS 3, and the like, the one-time authentication key may not be replenished in time. The case where the authentication of the portable device 2 fails due to the left state is a case where the trunk door is closed after the portable device 2 has remained placed in the trunk for the leaving determination time. When the user performs the locking operation with the portable device 2 placed in the trunk, and the leaving determination time then elapses while the user arranges baggage or talks with a passenger or the like, authentication failure due to the left state may occur. The user authentication state may also be naturally released over time or the like. According to the configuration of the present disclosure, it is possible to reduce the possibility that the confinement warning and the residual device invalidation are inoperative in the above cases, which may occur sufficiently although not frequently.

Although the embodiment of the present disclosure has been described above, the present disclosure is not limited to the embodiment described above, and various modifications described below are also included in the technical scope of the present disclosure, and various modifications other than the following can be made without departing from the scope of the present disclosure. The following various supplements and modifications can be combined as appropriate and performed within a range in which no technical contradiction occurs. Members having the same functions as the members described above are denoted by the same reference numerals, and the description thereof may be omitted. When only a part of the configuration is referred to, the above description can be applied to other portions.

<Execution of Intra-Trunk Confirmation Process>

In the trunk unlocking process described above, only when the smart ECU 4 recognizes that the portable device 2 is confined in the trunk, the intra-trunk confirmation process is performed, triggered by the touching of the trunk locking/unlocking sensor 5, but the present invention is not limited thereto. When the trunk locking/unlocking sensor 5 is touched, both the intra-trunk confirmation process and the outer-trunk confirmation process may be performed regardless of whether confinement has occurred. At that time, the smart ECU 4 may ignore the response from the invalid portable device 2. The invalidated portable device 2 may be validated when the vehicle Hv is unlocked using another portable device 2.

<Mounting Position of BLE Communicator>

The number and arrangement mode of the BLE communicators 7 described above are merely examples and can be changed as appropriate. The BLE communicator 7*a* and the BLE communicator 7*b* may be disposed on the outer surface of the B pillar or the C-pillar. The B pillar of the vehicle Hv can be divided into a door-side B pillar included in the door module and a vehicle-body-side B pillar as a support column/frame including the roof portion of the vehicle body. The door-side B pillar corresponds to a portion in contact with the vehicle-body-side pillar in the front seat door or the rear seat door. The outdoor unit can adopt a portion of the door-side B pillar adjacent to the side window, that is, a portion above the lower end of the side window. The outdoor unit may be disposed on a surface of the vehicle exterior side-B-pillar on the vehicle's exterior side.

Figure 13:
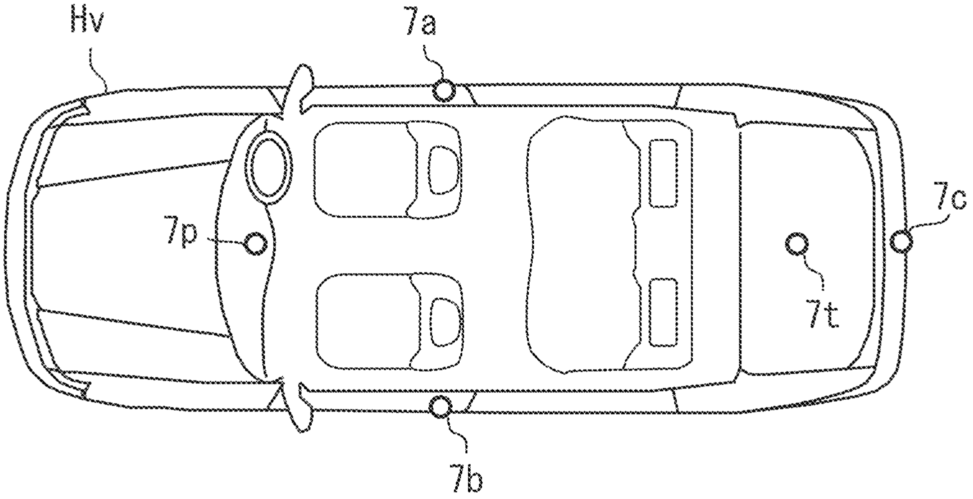
FIG. 13 is a diagram illustrating another arrangement example of the BLE communicator.

The BLE communicator 7*p* may be disposed near the shift lever, near the start switch 6, at the center console, at the feet of the driver's seat, or in other places. The BLE communicator 7*p* may be disposed on the vehicle interior side surface of the door for the driver's seat, such as in a door pocket or at the base of the B-pillar. There may be a plurality of indoor units. The in-vehicle system 1 may include the BLE communicator 7 disposed on the indoor-side surface of the right door and the BLE communicator 7 disposed on the indoor-side surface of the left door. As illustrated in FIG. 13, the in-vehicle system 1 may include an intra-trunk communicator 7*t* that is a BLE communicator 7 disposed in the trunk.

<Method for Determining Device Location>

Whether the portable device 2 is present in the trunk may be determined based on reception strength from the portable device 2 at the intra-trunk communicator 7*t*. The location determination unit F32 may determine that the portable device 2 is present in the trunk based on the fact that the reception strength from the portable device 2 in the intra-trunk communicator 7*t* is a predetermined value or more. Similarly, the location determination unit F32 may determine that the portable device 2 is present in the cabin based on the fact that the reception strength of the indoor unit is the predetermined value or more.

<Modification of Space as Target for Confinement Warning/Invalidation>

Figure 14:
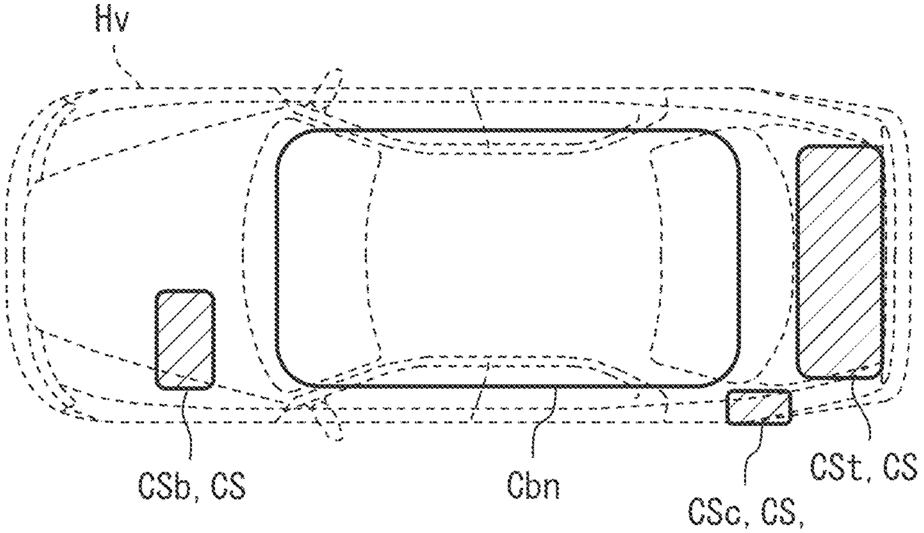
FIG. 14 is a diagram illustrating an example of an independent space portion included in a vehicle.

As illustrated in FIG. 14, the vehicle Hv may include, in addition to a trunk inner space CSt, a charging inlet housing portion CSc, a front housing portion CSb disposed inside the hood, and the like as closed spaces independent of the cabin (Cbn). The trunk inner space CSt is the inner space of the trunk, and the charging inlet housing portion CSc is the inner space of a charging lid. An independent space portion CS to which the confinement warning process or the like of the portable device 2 is applied may be the charging inlet housing portion CSc, the front housing portion CSb, or the like. The charging lid is a lid that closes an opening portion where a connector or the like connected to a charging plug/cable is disposed, and is also referred to as a charging port lid.

Although the operation when the portable device 2 is left in the trunk has been described above, the above configuration is also applicable to a case where the portable device 2 is left in the cabin. The smart ECU 4 may also perform confinement warning, invalidation, or the like when the portable device 2 for which wireless authentication has failed due to the specific reason is present in the cabin. The interior of the vehicle includes, in addition to the cabin, the interior of the trunk, the charging inlet housing portion, the front housing portion, and the like.

<One-Time Authentication Key Issuing Terminal>

In the embodiment described above, the aspect in which the DKS 3 generates a one-time authentication key and distributes the one-time authentication key to the portable device 2 has been exemplified, but the present invention is not limited thereto. The smart ECU 4 may generate and distribute a one-time authentication key on condition that the wireless authentication process is successful. DKS 3 is an optional element and can be omitted. The DKS 3 and the smart ECU 4 correspond to the issuing terminal.

<Others>

The control that can be executed by the smart ECU 4 when the authentication fails due to the specific reason may be limited to both or only one of the confinement warning and the residual device invalidation. When the authentication of the portable device 2 fails, the smart ECU 4 may be configured not to perform the control of unlocking the door leading to the cabin regardless of the reason for the failure. Regarding the control for switching the traveling power source from OFF to ON, the smart ECU 4 may be configured not to perform the control even if the authentication failure reason is the specific reason when the authentication of the portable device 2 is unsuccessful. The control to lock the vehicle Hv may be performed even if the authentication is unsuccessful on the condition that the authentication failure reason is the specific reason, the communication partner is a registered device, and the communication partner is present in the locking/unlocking area. According to this configuration, it is possible to enhance the convenience of the user while reducing the possibility that the vehicle Hv is used by a third party.

<Appendix>

The device, the system, and the method thereof described in the present disclosure may be implemented by a dedicated computer that is configured by a processor programmed to execute one or more functions by executing a computer program. The device and the method described in the present disclosure may be also implemented by a dedicated hardware logic circuit. Further, the device and the method described in the present disclosure may be also implemented by one or more dedicated computers which are constituted by combinations of a processor for executing computer programs and one or more hardware logic circuits. Some or all of the functions of the smart ECU 4 may be configured as hardware. A configuration in which certain function is implemented by hardware logic circuitry includes a configuration in which the function is implemented using one or more ICs or the like. As the processor (i.e., arithmetic core), a CPU, an MPU, a GPU, a DFP (Data Flow Processor), or the like can be adopted. Some of the functions provided by the smart ECU 4 may be realized using a SoC (System-on-Chip), IC (Integrated Circuit), or FPGA (Field-Programmable Gate Array). The aspect of the IC also includes ASIC (i.e., Application Specific Integrated Circuit).

The computer program described above may be stored in a computer-readable non-transitory tangible storage medium as instructions to be executed by a computer. The storage medium for a program may be a hard disk drive (HDD), a solid state drive (SSD), or a flash memory. The scope of the present disclosure also includes programs for causing a computer to function as a smart ECU 4, a non-transitory tangible storage mediums such as semiconductor memories which store these programs, and other aspects.

What is claimed is:

1. A vehicle control apparatus that determines a location of a key device through wireless communication with the key device, the key device being a portable device registered in advance as a key of a vehicle, the vehicle control apparatus comprising:

at least one of (i) a circuit and (ii) a processor with a memory storing computer program code executable by the processor, the at least one of the circuit and the processor configured to serve as:

a location determination unit configured to acquire reception status data of a wireless signal including a parameter indicating characteristic of the received wireless signal and calculate, based on the reception status data and the positions in the vehicle, a position of a communication partner relative to the vehicle;

a device location confirmation unit that is configured to perform a wireless authentication process of determining whether the communication partner is the key device based on data transmitted from the communication partner, and a location determination process of determining whether the communication partner is present in the vehicle based on the position of the communication partner calculated by the location determination unit; and a failure reason identification unit that is configured to identify, based on the data received from the communication partner, an authentication failure reason that is a reason why the communication partner has failed to be determined as the key device when the device location confirmation unit has failed to determine that the communication partner is the key device in the wireless authentication process, wherein the device location confirmation unit considers the key device to be present in the vehicle even if the device location confirmation unit has been unable to determine that the communication partner is the key device when the authentication failure reason is a specific reason and the communication partner has been determined to be located in the vehicle, and when it is determined that the key device is present in a trunk in an open-time confirmation process, a response processing unit performs a process for switching a locking mechanism for the trunk to an unlocked state.

2. The vehicle control apparatus according to claim 1, wherein the device location confirmation unit determines whether the communication partner is present in an independent space portion that is a closed space included in the vehicle and independent of a cabin, based on the position of the communication partner calculated by the location determination unit, and the device location confirmation unit considers the key device to be present in the independent space portion even if the device location confirmation unit has been unable to determine that the communication partner is the key device when the authentication failure reason is the specific reason and the communication partner has been determined to be present in the independent space portion.

3. The vehicle control apparatus according to claim 2, wherein the independent space portion is the trunk.

4. The vehicle control apparatus according to claim 3, wherein the device location confirmation unit confirms whether the key device is present in the trunk in response to a trunk door being closed after setting of the vehicle to a locked state with only the trunk door open.

5. The vehicle control apparatus according to claim 4, configured to prevent the key device from being confined in the trunk, wherein the response processing unit is configured to perform a process for warning that the key device is present in the trunk when the device location confirmation unit determines that the key device is present in the trunk at a time of closing the trunk door, wherein when a user operation for opening the trunk door is detected after the warning, the device location confirmation unit performs the open-time confirmation process of confirming whether the key device is present in the trunk.

6. The vehicle control apparatus according to claim 3, configured to be able to register a plurality of key devices, wherein the device location confirmation unit determines whether the key device is present in the trunk in response to receiving a user operation for locking the vehicle in a state where all doors are closed.

7. The vehicle control apparatus according to claim 6, wherein when the device location confirmation unit determines that the key device is present in the trunk at a time of locking the vehicle, the key device present in the trunk is invalidated.

8. The vehicle control apparatus according to claim 1, wherein the wireless authentication process includes the steps of transmitting a challenge code to the communication partner, and generating, by the communication partner, a response code using a disposable one-time authentication key generated by a predetermined issuing terminal as a response to the challenge code, and transmitting the response code toward the vehicle, wherein the key device is configured to return an authentication key shortage signal indicating that the one-time authentication key is insufficient when the key device has no one-time authentication key, the device location confirmation unit fails to determine that the communication partner is the key device when the authentication key shortage signal is received, the failure reason identification unit determines, based on the reception of the authentication key shortage signal, that the authentication failure reason is an authentication key shortage, and the authentication key shortage has been set as the specific reason.

9. The vehicle control apparatus according to claim 1, wherein the key device is configured to return a no-motion signal indicating that the key device has remained stationary for a predetermined time in response to a response request signal from the vehicle when a stationary state continues for a predetermined time, the device location confirmation unit fails to determine that the communication partner is the key device when the no-motion signal is received, the failure reason identification unit determines, based on the reception of the no-motion signal, that the authentication failure reason is a no-motion, and the no-motion has been set as the specific reason.

10. The vehicle control apparatus according to claim 1, wherein the key device includes a user authentication function that determines validity of the user by using biometric information or a password, and is configured to return a user non-authentication signal indicating that the authentication of the user is unsuccessful to a response request signal from the vehicle when the authentication of the user is unsuccessful, the device location confirmation unit fails to determine that the communication partner is the key device when the user non-authentication signal is received, the failure reason identification unit determines, based on the reception of the user non-authentication signal, that the authentication failure reason is user non-authentication, and the user non-authentication has been set as the specific reason.

11. The vehicle control apparatus according to claim 2, wherein the independent space portion is an inner space of a charging lid or an inner space of a hood.

12. The vehicle control apparatus according to claim 1, wherein the device location confirmation unit acquires a device ID of the communication partner;

the device location confirmation unit executes the location determination process and the wireless authentication process on condition that the device identifier (ID) is registered as the key device, and even when the wireless authentication process fails, the device location confirmation unit considers the key device corresponding to the device ID of the communication partner is considered to be present in the vehicle on condition that the device ID has been registered as the key device, the authentication failure reason is the specific reason, and the communication partner has been determined to be located in the vehicle.

13. A vehicle control method that is performed by at least one processor to determine a location of a key device through wireless communication with the key device, the key device being a portable device registered in advance as a key of a vehicle, the vehicle control method comprising:

acquiring reception status data of a wireless signal including a parameter indicating characteristics of the received wireless signal and calculate, based on the reception status data and the positions in the vehicle, a position of a communication partner relative to the vehicle;

determining whether the communication partner is present in the vehicle based on the position of the communication partner calculated;

determining whether the communication partner is the key device based on data transmitted from the communication partner;

identifying, based on a content of the data received from the communication partner, an authentication failure reason that is a reason why the communication partner has failed to be determined as the key device when the communication partner has failed to be determined to be the key device; and considering the key device to be present in the vehicle even if the communication partner has failed to be determined to be the key device when the authentication failure reason is a specific reason and the communication partner has been determined to be present in the vehicle, wherein when it is determined that the key device is present in a trunk in an open-time confirmation process, the at least one processor performs a process for switching a locking mechanism for the trunk to an unlocked state.

14. A vehicle control apparatus that determines a location of a key device through wireless communication with the key device, the key device being a portable device registered in advance as a key of a vehicle, the vehicle control apparatus comprising:

at least one of (i) a circuit and (ii) a processor with a memory storing computer program code executable by the processor, the at least one of the circuit and the processor configured to serve as a device location confirmation unit that is configured to perform a wireless authentication process of determining whether a communication partner is the key device based on data transmitted from the communication partner, and a location determination process of determining whether the communication partner is present in the vehicle based on a reception status of a signal from the communication partner; and a failure reason identification unit that is configured to identify, based on the data received from the communication partner, an authentication failure reason that is a reason why the communication partner has failed to be determined as the key device when the device location confirmation unit has failed to determine that the communication partner is the key device in the wireless authentication process, wherein the device location confirmation unit considers the key device to be present in the vehicle even if the device location confirmation unit has been unable to determine that the communication partner is the key device when the authentication failure reason is a specific reason and the communication partner has been determined to be located in the vehicle, the device location confirmation unit determines whether the communication partner is present in an independent space portion that is a closed space included in the vehicle and independent of a cabin, based on the position of the communication partner calculated by a location determination unit, the device location confirmation unit considers the key device to be present in the independent space portion even if the device location confirmation unit has been unable to determine that the communication partner is the key device when the authentication failure reason is the specific reason and the communication partner has been determined to be present in the independent space portion, the independent space portion is a trunk, the device location confirmation unit confirms whether the key device is present in the trunk in response to a trunk door being closed after setting of the vehicle to a locked state with only the trunk door open, and the vehicle control apparatus is configured to prevent the key device from being confined in the trunk, the at least one of the circuit and the processor is further configured to serve as a response processing unit that is configured to perform a process for warning that the key device is present in the trunk when the device location confirmation unit determines that the key device is present in the trunk at a time of closing the trunk door, wherein when a user operation for opening the trunk door is detected after the warning, the device location confirmation unit performs an open-time confirmation process of confirming whether the key device is present in the trunk, and when it is determined that the key device is present in the trunk in the open-time confirmation process, the response processing unit performs a process for switching a locking mechanism for the trunk to an unlocked state.

15. The vehicle control apparatus according to claim 1, wherein the at least one of the circuit and the processor is further configured to:

transmit a response request signal to the key device;

receive, from the key device, an authentication disable signal indicating that the key device is not able to return a response code;

receive, from the key device, a ready signal indicating that the key device is ready for the wireless authentication process; and in response to receiving the ready signal, transmit a challenge code to the key device to re-perform the wireless authentication process.

16. The vehicle control apparatus according to claim 1, wherein the response processing unit is configured to output a control signal to a door lock actuator to switch a locking mechanism of at least one door of the vehicle between a locked state and an unlocked state based on at least one of (i) a result of the wireless authentication process and (ii) the position of the communication partner relative to the vehicle calculated by the location determination unit.

17. The vehicle control apparatus according to claim 1, wherein the response processing unit is configured to, upon receiving from the key device a window operation instruction signal, output a control signal to cause a window of the vehicle to be opened or closed.

* * * * *